(12) United States Patent
Nagasaka et al.

(10) Patent No.: US 10,906,163 B2
(45) Date of Patent: Feb. 2, 2021

(54) POWER TOOL

(71) Applicant: MAKITA CORPORATION, Anjo (JP)

(72) Inventors: Hidenori Nagasaka, Anjo (JP); Ryunosuke Kumagai, Anjo (JP); Koji Tsukamoto, Anjo (JP); Tomonori Kawase, Anjo (JP); Kosuke Ito, Anjo (JP); Tokuo Hirabayashi, Anjo (JP); Yasuhito Kawai, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 16/654,461

(22) Filed: Oct. 16, 2019

(65) Prior Publication Data

US 2020/0047319 A1 Feb. 13, 2020

Related U.S. Application Data

(62) Division of application No. 15/356,862, filed on Nov. 21, 2016, now Pat. No. 10,478,950.

(30) Foreign Application Priority Data

Nov. 26, 2015 (JP) ................................ 2015-230861
Jun. 30, 2016 (JP) ................................ 2016-130386

(51) Int. Cl.
*B25B 23/00* (2006.01)
*B25B 23/147* (2006.01)
(Continued)

(52) U.S. Cl.
CPC .......... *B25B 23/1475* (2013.01); *B25B 21/02* (2013.01); *B25B 23/00* (2013.01);
(Continued)

(58) Field of Classification Search
CPC .... B25B 23/1475; B25B 23/00; H02K 7/145; B25F 5/02
See application file for complete search history.

(56) References Cited

U.S. PATENT DOCUMENTS

2005/0121209 A1 6/2005 Shimizu et al.
2005/0263305 A1 12/2005 Shimizu et al.
(Continued)

FOREIGN PATENT DOCUMENTS

JP H07132425 A 5/1995
JP 2003185151 A 7/2003
(Continued)

OTHER PUBLICATIONS

Office Action from the Japanese Patent Office dated Mar. 24, 2020 in related Japanese application No. 2018-1626956, and machine translation thereof.

(Continued)

*Primary Examiner* — Evan P Dzierzynski
(74) *Attorney, Agent, or Firm* — J-Tek Law PLLC; Jeffrey D. Tekanic; Scott T. Wakeman

(57) ABSTRACT

A power tool includes a tool-main-body part, an electric motor as a drive source, a grip part, which extends downward from the tool-main-body part and is configured to be gripped by a user, and a power-supply unit at a tip of the grip part. The power tool includes a controller configured to control the operation of the electric motor, the controller being located on the power-supply unit, and a display controlled by the controller and configured to indicate an operating state of the electric motor. The controller and the display each have a flat-plate shape and are disposed along a surface direction with respect to one another, and the display includes a first portion that overlies the controller and a second portion that projects beyond an end edge of the controller.

21 Claims, 15 Drawing Sheets

(51) Int. Cl.
*H02K 7/14* (2006.01)
*B25F 5/02* (2006.01)
*H02K 11/33* (2016.01)
*B25B 21/02* (2006.01)
*H01H 13/02* (2006.01)
*H01H 13/08* (2006.01)

(52) U.S. Cl.
CPC .............. *B25F 5/02* (2013.01); *H01H 13/023* (2013.01); *H01H 13/08* (2013.01); *H02K 7/145* (2013.01); *H02K 11/33* (2016.01); *H01H 2219/062* (2013.01); *H01H 2221/016* (2013.01)

(56) References Cited

U.S. PATENT DOCUMENTS

| | | |
|---|---|---|
| 2013/0000934 A1 | 1/2013 | Tadokoro et al. |
| 2013/0076271 A1 | 3/2013 | Suda et al. |
| 2013/0105187 A1 | 5/2013 | Agehara et al. |
| 2013/0105188 A1 | 5/2013 | Sakamaki et al. |
| 2013/0126202 A1 | 5/2013 | Oomori et al. |
| 2013/0186666 A1 | 7/2013 | Yoshino et al. |
| 2013/0307355 A1 | 11/2013 | Sakamaki |
| 2013/0327552 A1* | 12/2013 | Lovelass ............... B25B 23/147 173/1 |
| 2014/0158390 A1 | 6/2014 | Mashiko et al. |
| 2014/0284070 A1* | 9/2014 | Ng ............... B25F 5/02 173/2 |
| 2016/0121466 A1* | 5/2016 | Kiyohara ................ B25F 5/008 362/120 |

FOREIGN PATENT DOCUMENTS

| | | |
|---|---|---|
| JP | 2005324264 A | 11/2005 |
| JP | 2006000971 A | 1/2006 |
| JP | 2011136378 A | 7/2011 |
| JP | 2012030325 A | 2/2012 |
| JP | 2012139747 A | 7/2012 |
| JP | 2012139748 A | 7/2012 |
| JP | 2013022681 A | 2/2013 |
| JP | 2013066991 A | 4/2013 |
| JP | 2013094912 A | 5/2013 |
| JP | 5370751 B2 | 12/2013 |

OTHER PUBLICATIONS

Office Action from the Japanese Patent Office dated Dec. 14, 2017 in related Japanese application No. 2016-130386, and machine translation thereof.

Office Action from the Japanese Patent Office dated Jun. 9, 2020 in related Japanese application No. 2018-1626956, and machine translation thereof.

* cited by examiner

POWER TOOL

CROSS-REFERENCE TO RELATED APPLICATIONS

This application is a divisional of U.S. patent application Ser. No. 15/356,862, filed Nov. 21, 2016, now U.S. Pat. No. 10,478,950, which application claims priority to Japanese patent application no. 2015-230861 filed on Nov. 26, 2015 and to Japanese patent application no. 2016-130386 filed on Jun. 30, 2016, the contents of which applications are incorporated herein by reference.

TECHNICAL FIELD

The present disclosure is directed to a power tool in which an electric motor is built in as a drive source.

BACKGROUND

Power tools, such as, for example, driver drills, impact drivers and screwdrivers, are designed such that the rotational speed, the output power, and the like of an electric motor are appropriately controlled so that screw tightening is performed smoothly without the occurrence of a malfunction such as a so-called "cam out". Consequently, in various power tools, a display is provided to enable a user to visually confirm the rotational speed, the output power, and the like (the operating state) of the built-in electric motor. Japanese Patent No. 5370751 discloses a technique for protecting a display part, which is disposed on a rear surface of a tool main body, from shock when, for example, the tool main body is dropped. In addition, Japanese Laid-open Patent Publication 2012-139747 and its counterpart US 2013-000934 disclose a rotary-impact tool that is provided with a controller, which is located in a lower part of a grip part gripped by a user and which controls the operation of an electric motor, and a display that visually displays the operating state and the like of the electric motor, the operation of which is controlled by the controller.

SUMMARY

A controller-display, which visually communicates the operating state of the power tool, has the following problems. In recent years, rotary tools including driver drills and screwdrivers, and rotary-impact tools in particular, have been developed that are able to switch their operating mode in accordance with the type of work to be performed, the type of screw to be tightened, and the like. Furthermore, because these screwdrivers and related tools have been made multifunctional, such as by enabling them to arbitrarily set the output-rotational speed, there is a tendency to make the controller, as well as the display of the controller, larger. In addition, if one or more of a mode-changing switch, an illumination switch that turns an illumination device ON and OFF, etc. also is disposed on the display, then the display tends to be made even larger.

Nevertheless, the display, which collectively displays various operating states, usually has a flat-plate shape (a display panel) and therefore can be disposed adjacent the controller; in addition, taking into consideration, for example, the need for the location of the display to be visible to the user, and to be flat, and the like, there is a limit on the maximum practicable size of the display. Conversely, if the display portion of a multifunction display is reduced in size, then the visibility of each display element and of any associated text inscription is impaired, and the ease of operation of the various switches is also impaired.

In view of the above-noted circumstances, one aspect of the present disclosure is to enable a display, which principally displays the operating state of an electric motor, etc. via a controller, to have a greater number of display elements—without impairing visibility, ease of operation, and the like of the display—and to enable various operation switches to be disposed on the display.

A first embodiment of the present disclosure is a power tool comprising a tool-main-body part, wherein an electric motor is built in as a drive source, a grip part, which extends downward from the tool-main-body part and is configured to be gripped by a user, and a power-supply unit located at a tip of the grip part. The first embodiment comprises: a controller, which controls the operation of the electric motor and which is mounted on the power-supply unit; and a display, which is controlled by the controller and indicates the operating state of the electric motor. The first embodiment has a configuration in which the controller and the display each have a flat-plate shape and are disposed parallel to one another. Furthermore, the display is disposed such that it projects in the surface direction from the controller.

According to the first embodiment, because the display is disposed such that it projects from the controller in the surface direction, the displayable surface area of the display is increased by the area of the projected portion, and thereby a greater number of displays or operation switches can be disposed on the display portion. Because this embodiment does not increase the number of displays or operation switches by reducing the size(s) of the displays or the operation switches, the visibility and the ease of operation thereof are not impaired.

Up to now, this type of display has been disposed such that it does not project from the controller. Generally, the operation switches, the light emitting parts, and the like of the display are positioned directly above the button switches, the LEDs (light-emitting diodes), and the like installed on the controller. Therefore, until now, the display has been assembled (mounted) at a location at which it does not project from the controller in the surface direction such that the display substantially overlaps the controller. Consequently, the display has a surface area sufficient to cover, from directly above, the button switches, the LEDs, and the like of the controller. In addition, the operation switches, the light-emitting parts, and the like are disposed within the extent of that surface area. Therefore, the text inscriptions that indicate the type of each operation switch, light-emitting part, and the like are disposed within the extent of that surface area. As a result, the number of light-emitting parts, operation switches, and the like that can be disposed on the display is limited by the amount of space available.

The first embodiment takes advantage of the fact that, if the surface area of the display is increased by projecting the display from the controller in a range (by a spatial amount) that does not cause a problem, such as the display adversely being concealed by the user's hand while holding the grip part, and if, for example, the text inscriptions are disposed in that projected portion, then a greater number of the light-emitting parts, operation switches, and the like can be disposed within the portion over the controller that does not project from the controller.

A second embodiment is the power tool according to the first embodiment, wherein the display has an operation switch, a light-emitting part, and a text inscription that indicates the type of operation switch or light-emitting part.

The text inscription is inscribed in the portion of the display that projects from the controller in the surface direction.

According to the second embodiment, as a result of inscribing descriptive text in the projected portion, space is created, to the extent of that portion, in the portion that does not project from the controller. Therefore, a greater number of operation switches, light-emitting parts, and the like can be disposed in this vacant portion.

A third embodiment is the power tool according to the first or second embodiment, wherein the display and the controller are assembled (mounted) onto the power-supply unit as separate components from one another.

According to the third embodiment, it is possible to avoid the problem in which the ease-of-handling and the easy-of-assembling of these components would be impaired owing to the display being assembled (mounted) onto the controller such that it projects in the surface direction.

A fourth embodiment is the power tool according to any one of the first to third embodiments, wherein the display comprises one illumination switch and two mode-changing switches.

According to the fourth embodiment, the text inscription of the illumination switch or the text inscription of the mode-changing switch can be inscribed on the display before the display is assembled onto the controller in the portion that projects from the controller in the surface direction.

A fifth embodiment is the power tool according to any one of the first to fourth embodiments, wherein a rechargeable-battery pack, which serves as direct-current power supply, is configured to be mounted onto the power-supply unit. In addition, the display comprises a light-emitting part that indicates the remaining charge level (remaining battery capacity) of the battery pack.

According to the fifth embodiment, the text inscription of the light-emitting part that displays the remaining charge level can be inscribed on the display before the display is assembled onto the controller in the portion that projects from the controller in the surface direction.

A sixth embodiment is the power tool according to any one of the first to fifth embodiments, wherein the display comprises two light-emitting-part rows, front and rear, each row having a plurality of the light-emitting parts disposed in a left-right, transversely lined-up state.

According to the sixth embodiment, the plurality of light-emitting parts can be disposed with good efficiency and in good order.

A seventh embodiment is the power tool according to any one of the first to sixth embodiments, wherein in the display, the plurality of light-emitting parts, in which the content (information) indicated by each light-emitting part differs, is disposed in the left-right, transversely lined-up state.

According to the seventh embodiment, light-emitting parts having differing display functions can be displayed with good efficiency and in good order.

An eighth embodiment of the present disclosure is a power tool, comprising: an electric motor; a tool-accessory retaining part (tool chuck), which is disposed on a forward side of the electric motor and is driven by the electric motor; a tool-main-body part (housing), which houses the electric motor; a grip part (grip or handle), which extends downward from the tool-main-body part and is configured to be gripped by a user; and an expanded part, which is disposed downward of the grip part. At least one LED is housed in the expanded part; a light-emitting part from which the light of the LED(s) is radiated, is provided on an upper surface of the expanded part; and a text inscription(s) associated with the LED(s) is disposed forward of the light-emitting part.

According to the eighth embodiment, in the area in which the text denotation(s) associated with the LED(s) is inscribed, the display can be expanded forward of the circuit board on which the LED(s) is (are) installed, and thereby a greater number of switches and light-emitting parts can be disposed without impairing the visibility and the ease of operation of the display.

A ninth embodiment of the present disclosure is a power tool, comprising: an electric motor; a tool-accessory retaining part (tool chuck), which is disposed on a forward side of the electric motor and is driven by the electric motor; a tool-main-body part (housing), which houses the electric motor; a grip part, which extends downward from the tool-main-body part and is configured to be gripped by a user; and an expanded part, which is disposed downward of the grip part. At least one LED is housed in the expanded part; a light-emitting part from which the light of the LED(s) is emitted, is provided on an upper surface of the expanded part; and in the up-down direction, the LED(s) and the light-emitting part are shifted in the surface direction with respect to one another.

According to the ninth embodiment, by shifting the display in the surface direction with respect to the circuit board on which the LED(s) is (are) installed, the display can be expanded to the extent of that shifted portion, and thereby a greater number of switches and light-emitting parts can be disposed without impairing the visibility and the ease of operation of the display.

A tenth embodiment of the present disclosure is a power tool comprising a tool-main-body part (housing), in which an electric motor serves as a drive source and a rotary-impact mechanism that imparts an impact force in a screw-tightening direction is built in, a grip part, which extends downward from the tool-main-body part and is configured to be gripped by a user, and a power-supply unit located at a tip of the grip part. In the tenth embodiment, the power-supply unit comprises a display, which indicates the operating state of the rotary-impact mechanism. The tenth embodiment has a configuration in which an impact-force-changing switch, which switches the impact force of the rotary-impact mechanism, an impact-force-display, which indicates the impact force, and a mode-display, which communicates that the operating state of the rotary-impact mechanism is in a preset specific operation mode, are disposed in one transverse row on the display. The tenth embodiment has a configuration in which, in the specific operation mode, control is performed such that the rotational speed of the electric motor is set to low-speed rotation in a screw-tightening initial stage and switches to high-speed rotation if the screw-tightening load exceeds a rotational speed.

According to the tenth embodiment, if the surface area of the power-supply unit is comparatively small, then the display can be disposed in a compact manner. By disposing the impact-force-changing switch, the impact-force-display, and the mode-display in one transverse row (a left-right, transversely lined-up state), the display is compactly configured in the front-rear direction. In the preset specific operation mode, the electric motor is automatically switched to high-speed rotation in accordance with the increasing screw-tightening load, thereby making it convenient to perform screw-tightening work.

An eleventh embodiment is the power tool according to the tenth embodiment, wherein the display is configured such that, if switched to a preset specific operation mode, then only a light-emitting part that is provided on the mode-display emits light.

According to the eleventh embodiment, switching to the preset operation mode makes it possible to increase visibility on the display.

A twelfth embodiment is the power tool according to tenth or eleventh embodiment, wherein the impact-force-changing switch has, in addition to a switching function of the impact force of the rotary-impact mechanism, a switching function to the preset specific operation mode, and a switching function that turns an illumination device provided on the tool-main-body part ON and OFF.

According to the twelfth embodiment, a compact display can be achieved by providing the plurality of switching functions in one impact-force-changing switch.

A thirteenth embodiment of the present disclosure is a power tool comprising a tool-main-body part (housing), in which an electric motor is built in as a drive source, a grip part (handle), which extends downward from the tool-main-body part and is configured to be gripped by a user, and a power supply unit at a tip (lower end) of the grip part. In the thirteenth embodiment, the power-supply unit comprises a display that indicates (displays) the operating state of the power tool. The thirteenth embodiment has a configuration in which the display comprises two light-emitting-part rows, front and rear, each row having a plurality of light-emitting parts disposed in one left-right transverse row.

According to the thirteenth embodiment, the display can be made multifunctional by disposing a large number of light-emitting parts with good efficiency.

DETAILED DESCRIPTION

Figure 1:
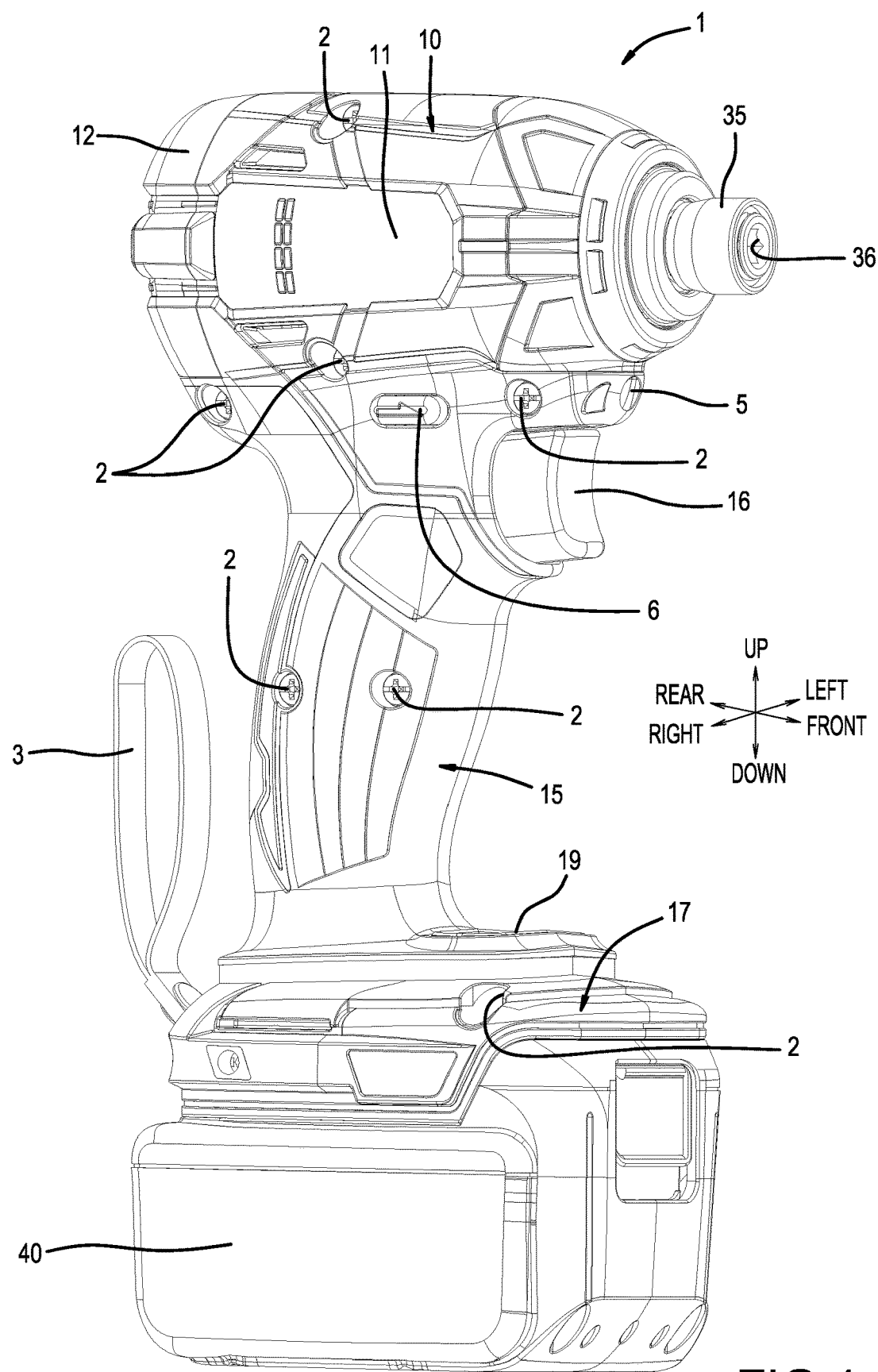
FIG. 1 is an overall oblique view of a power tool according to the present disclosure. This figure shows a state viewed diagonally from the right and front.
Figure 2:
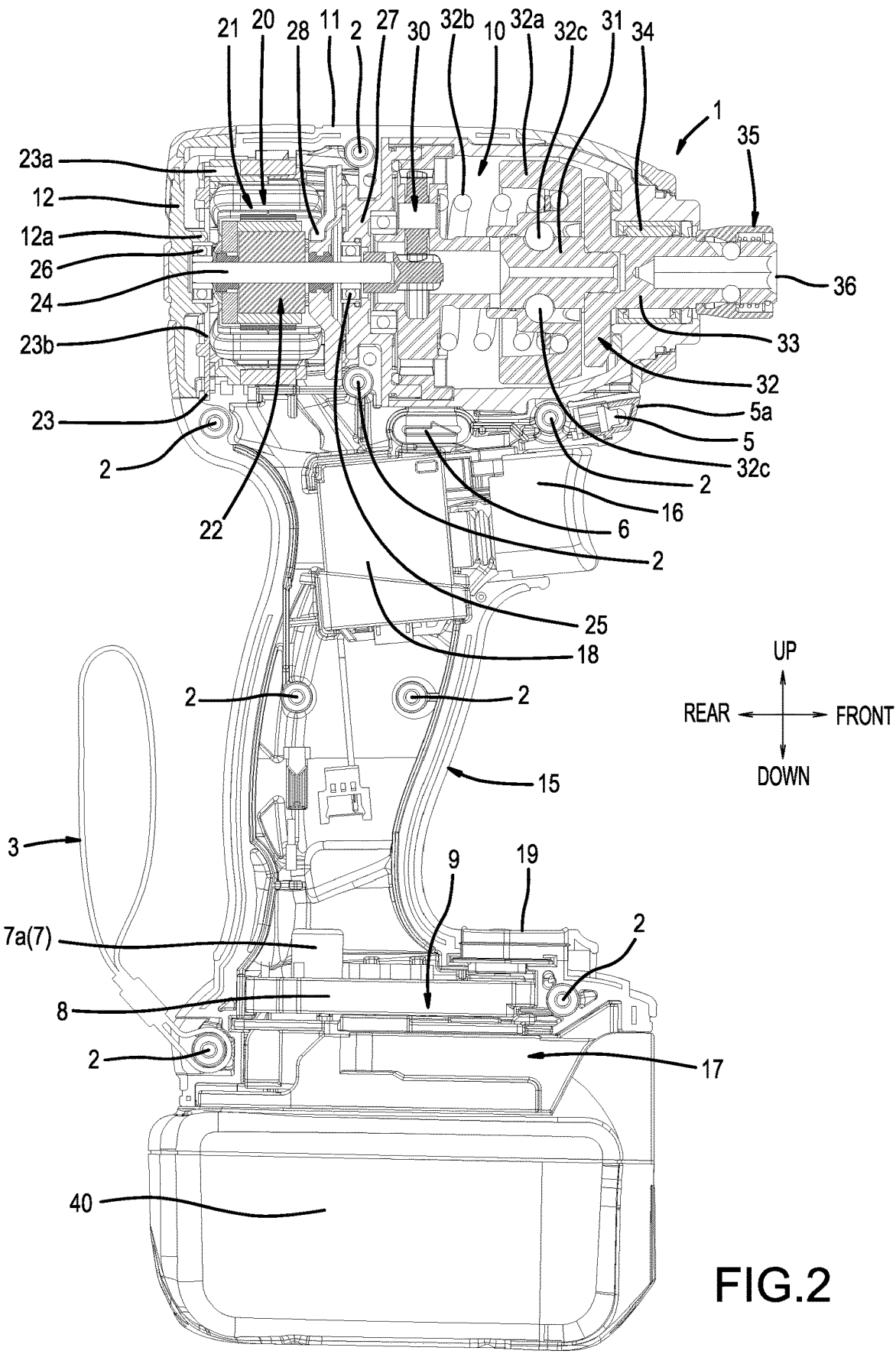
FIG. 2 is a longitudinal-cross-sectional view of the power tool according to the present disclosure.

Next, embodiments of the present disclosure will be explained, based on FIG. 1 to FIG. 19. FIG. 1 and FIG. 2 show a power tool 1, having an electric motor 20 as a drive source, according to the present embodiments. In the present examples, a so-called impact-type screwdriver (an impact driver) is shown as one representative, non-limiting example of a power tool 1 according to the present teachings. In the explanation below, in the front-rear direction of the power tool 1, the output side (the tool accessory side) is defined as the front side, and the near side, as viewed by a user of the power tool 1 during operation, is defined as the rear side. In addition, the left-right direction is used based on the power tool 1 being held by a user who grips a grip part 15 during a normal operation of the power tool 1.

The power tool 1 comprises a tool-main-body part (housing) 10 and a grip part (handle) 15, which protrudes downward from a lower surface of the tool-main-body part 10. The tool-main-body part 10 substantially comprises a circular-cylinder-shaped main-body case 11. The rear-surface side of the main-body case 11 is closed up by a rear-part case 12. The rear-part case 12 is fixed by two screws such that the rear-surface side of the main-body case 11 is closed up.

The grip part 15 is a portion that the user grips when using the power tool 1, and a trigger 16, which the user operates by pulling with a fingertip, is provided on a front-surface upper part of the grip part 15. When the trigger 16 is pulled, a main switch 18, which is housed inside the grip part 15, turns on, and the electric motor 20, which serves as the drive source, starts up (begins rotating).

The main-body case 11 and the grip part 15 each have a split-in-half structure in which left and right half cases are joined to one another and thereby integrated (assembled and joined). Mating surfaces of the split-in-half structure follow along an axis-line direction of a motor shaft 24. The main-body case 11 and the grip part 15 each have a split-in-half structure that is capable of being split into two portions, left and right, at the mating surfaces. The split-in-half structures of the main-body case 11 and the grip part 15 are joined together by a total of eight screws 2.

A power-supply unit 17 is provided on a lower part of the grip part 15, and a battery pack 40 that serves as the power supply of the power tool 1 is mounted to the power-supply unit 17. The power-supply unit 17 is configured such that it projects principally forward (to the right side in FIG. 1) (an expanded part). The battery pack 40 is mounted on a lower-surface side of the power-supply unit 17. A display 19, which is provided for visually communicating the operating state of the power tool 1, is provided on an upper surface of the power-supply unit 17. In the present embodiment, the display 19 has features that are described below.

As shown in FIG. 2—in order from the rear side of the main-body case 11—the electric motor 20, a planetary-gear mechanism 30, a drive shaft 31, a rotary-impact mechanism 32, and an anvil 33 are coaxially housed inside the main-body case 11. The rotational output of the electric motor 20 is transmitted to the anvil 33 via the planetary-gear mechanism 30 and the rotary-impact mechanism 32.

The rotary-impact mechanism 32 converts the rotation of the drive shaft 31 into rotary-impact motion with respect to the anvil 33, and therefore comprises: a hammer 32a, which is supported such that it is configured to rotate coaxially with respect to the drive shaft 31 and to move in the axial direction; a compression spring 32b, which biases the hammer 32a toward the tip side; and steel balls 32c, which restrict the axial-direction movement and the rotary motion of the hammer 32a.

The anvil 33 is supported such that it is configured for relative rotation coaxially with a tip of the drive shaft 31. A shaft part 36 (output shaft) of the anvil 33 is rotatably supported, via a circular-cylinder-shaped bearing 34, about an axis with respect to a tip part of the main-body case 11.

After a screw tightening process has started, the anvil 33 rotates, via the rotary-impact mechanism 32, in the screw-tightening direction integrally with the drive shaft 31 at a time when the screw-tightening load is small. As the screw tightening proceeds and the screw-tightening load eventually exceeds (surpasses) the rotational force transmitted to the drive shaft 31, then the hammer 32a retracts in the axial direction while rotating relative to the drive shaft 31 against the compression spring 32b. If the hammer 32a retracts against the compression spring 32b, then engagement with the anvil 33 is released. Consequently, owing to the biasing force of the compression spring 32b, the hammer 32a rotates while advancing, and the hammer 32a impacts (strikes) the anvil 33 in the screw-tightening direction. A tool-retaining part (tool chuck) 35, in (on) which a tool accessory (not shown), such as a driver bit or a socket bit, is mounted, is provided on the tip part of the output shaft 36, which protrudes from a front part of the main-body case 11.

The electric motor 20 is preferably a DC brushless motor that comprises a stator 21, which is fixed to an inner side of the main-body case 11, and a rotor 22, which is supported on an inner-circumference side of the stator 21 such that it is freely rotatable with a motor shaft 24. The motor shaft 24 is rotatably supported via two front and rear bearings 25, 26 about the axis line thereof. A ball bearing is used for each of the bearings 25, 26. The bearing 25, which is on the front side, is held by an intermediate-partition wall 27, which partitions the interior of the main-body case 11 into the front and the rear. The interior of the main-body case 11 is partitioned by the intermediate-partition wall 27 into the electric motor 20 side (rear side) and the rotary-impact mechanism 32 side (front side). A cooling fan 28 is mounted on the motor shaft 24 between the intermediate-partition wall 27 and the rotor 22. A so-called centrifugal fan is used as the cooling fan 28. The bearing 26, which is on the rear side, is held by a bearing-retaining part 12a provided on an inner surface of the rear-part case 12.

A sensor board 23, which has one or more magnetic sensors for detecting the rotational position of the rotor 22, is disposed on the rear side of the stator 21. The sensor board 23 has a substantially discoidal shape and is disposed such that it opposes a rear-end surface of the stator 21. An inner-circumference hole 23b of the sensor board 23 is formed as a large-diameter circular hole. As shown in FIG. 2, the above-mentioned rear-side bearing 26 and the bearing-retaining part 12a enter the interior of the inner-circumference hole 23b of the sensor board 23. Thereby, the tool length (i.e., the length in the motor-axis direction) of the tool-main-body part 10 can be reduced. The sensor board 23 is screw-fastened by three set screws 23a at trisected positions in the circumferential direction along a rear surface of an electrically insulating member of the stator 21. It is noted that the present embodiment illustrates a configuration in which the cooling fan 28 is disposed on the front side of the rotor 22 and the sensor board 23 is disposed on the rear-surface side of the stator, but the present embodiment can likewise be applied to an electric motor in which the locations of cooling fan and the sensor board are reversed in the front-rear direction.

An illumination device 5 is mounted on the front part of the tool-main-body part 10. One or more LEDs (light-emitting diodes) is (are) used in the illumination device 5. The illumination device 5 is covered by a transparent cover 5a. Work locations are brightly illuminated by the illumination device 5, thereby making it convenient to perform work in dark locations.

A changing switch (forward/reverse change lever) 6, which is provided for switching the rotational direction of the output shaft 36, is disposed on the upper side of the grip part 15, which is located at the lower-surface side of the tool-main-body part 10. By switching (sliding) the changing switch 6 to the left or right, the output shaft 36 can be rotated in the screw-tightening direction or the screw-loosening direction.

A loop-shaped hand strap 3 is mounted on a rear part of the power-supply unit 17. The hand strap 3 is coupled to the power-supply unit 17 by the rear-side screw 2 of the two screws 2 that join the left-right, split-in-half structures of the grip part 15 together. Passing one's wrist through the hand strap 3 before using the power tool 1 prevents the power tool 1 from accidently being dropped.

Figure 3:
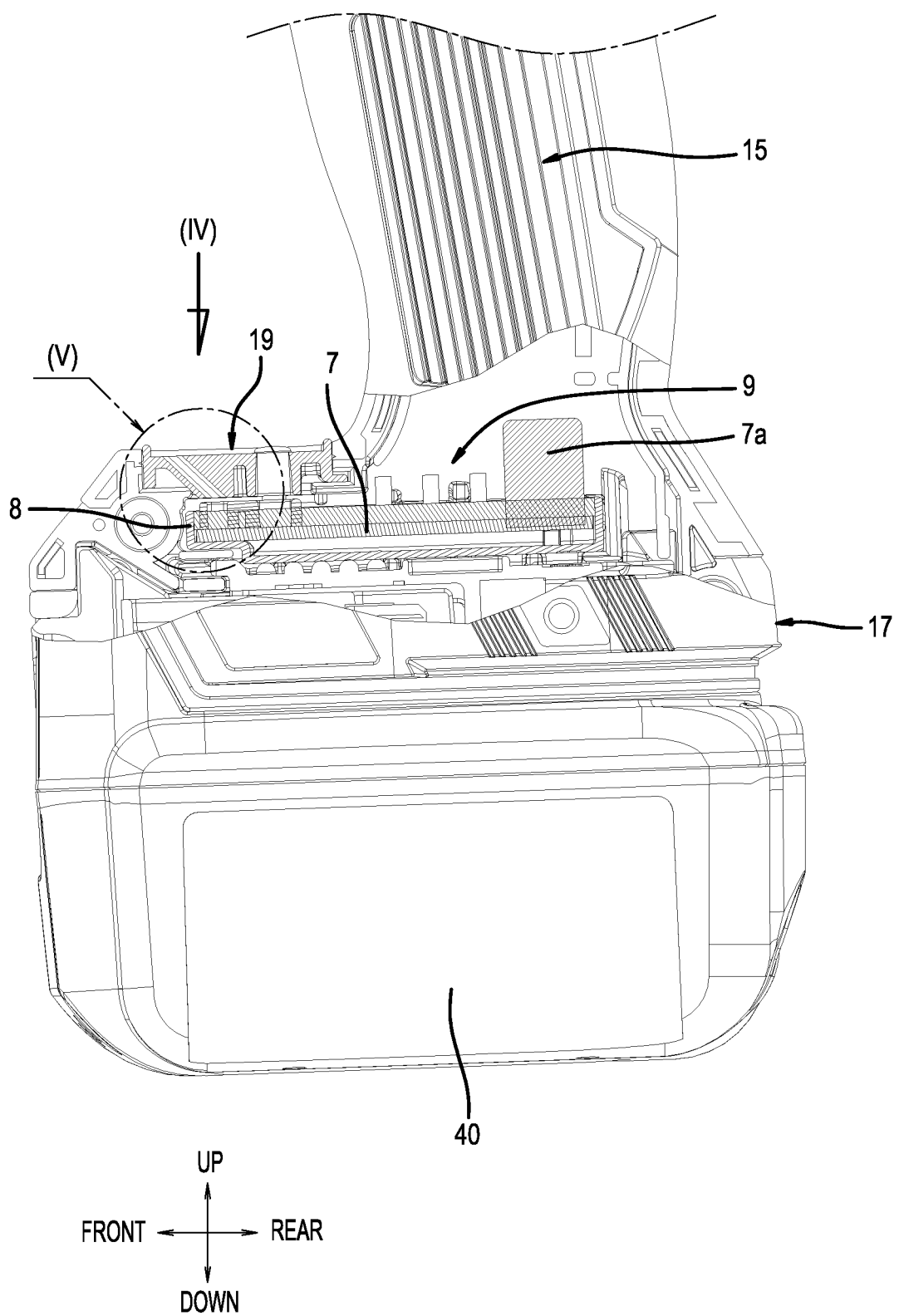
FIG. 3 is a left-side view of a power-supply unit.

As shown in FIG. 2 and FIG. 3, a flat-plate-shaped controller 9 is housed in the power-supply unit 17. The controller 9 includes a control board (circuit board) 7, which includes a motor-control circuit, a power-supply circuit, etc., housed in a rectangular, shallow-bottomed case 8. A capacitor 7a is mounted on an upper surface of the control board 7. The control board 7 is resin molded and housed in the case 8 in an insulated state. Positive and negative connection terminals for electrically connecting the battery pack 40 are mounted on the lower-surface side of the controller 9. Two power-supply lines, which are connected to the positive and negative connection terminals, are routed upward, wired into the grip part 15, and connected to the sensor board 23. A lower part of the sensor board 23 projects more on the outer-circumference side than does the stator 21, and the two power-supply lines are connected to a front surface of this projecting portion.

The battery pack 40 is mounted to the power-supply unit 17 by sliding the battery pack 40 from the front side to the rear side with respect to the lower surface of the power-supply unit 17. The battery pack 40 contains lithium-ion battery cells having a total rated output voltage of, for example, a 14.4 V, and can be repeatedly used by removing it and charging it with a separate charger.

The display 19, which is provided for displaying the remaining charge level (remaining battery capacity) of the battery pack 40, the operating state of the tool-main-body part 10 (electric motor 20), and the like, is provided on an upper surface of the power-supply unit 17. In the present embodiment, in addition to various displays, an illumination switch for switching the ON/OFF state of the illumination device 5, a mode-changing switch for switching the operation mode, and the like are disposed on the display 19, which thereby functions as an operation panel. The display 19 has a substantially trapezoidal-flat-plate shape, the front side being the short side, and is disposed above and along the controller 9. The display 19 is a separate component from the controller 9 and is mounted by fitting it into a window part provided on the upper surface of the power-supply unit 17.

Figure 4:
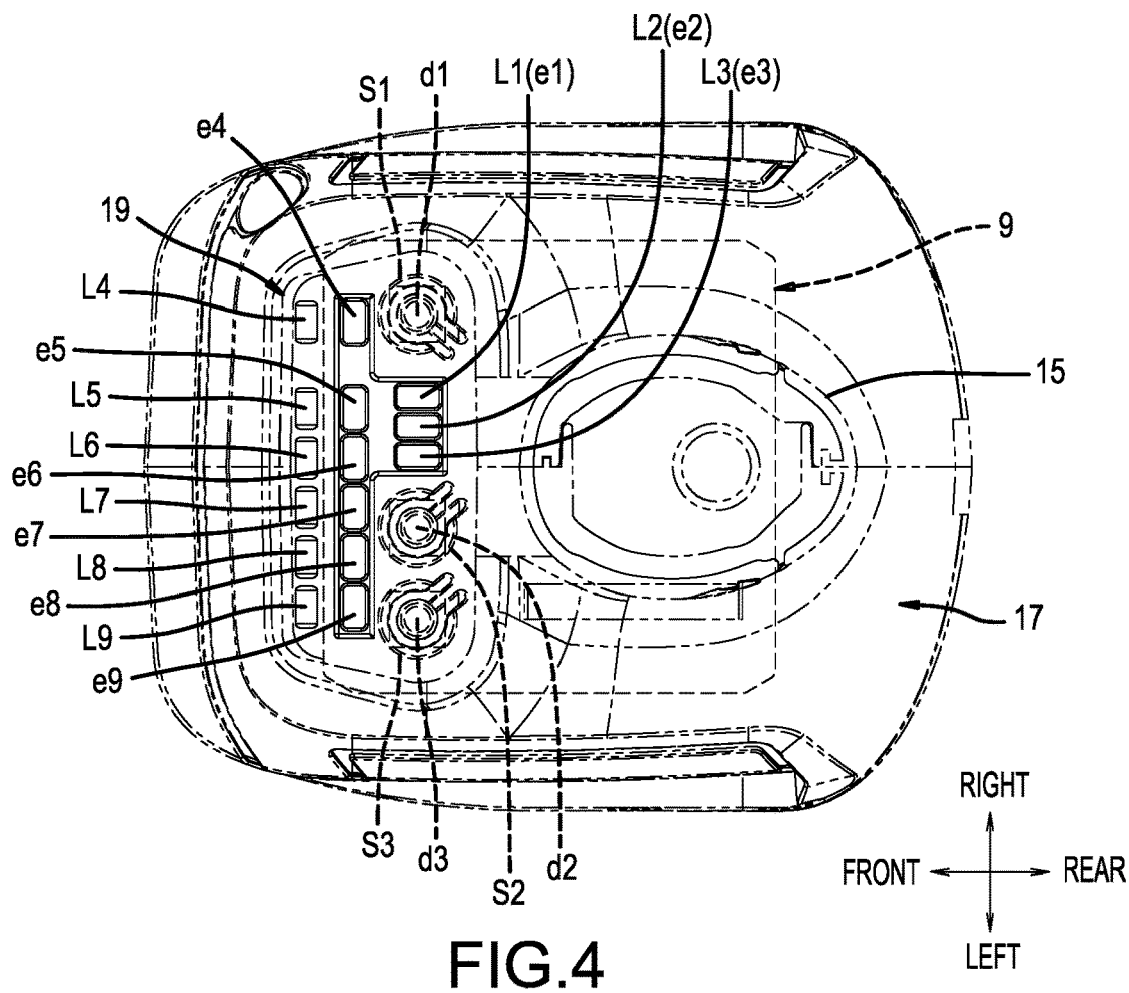
FIG. 4 shows the power-supply unit, viewed from the direction of arrow (IV) in FIG. 3, and is a plan view of a display according to a first embodiment.
Figure 5:
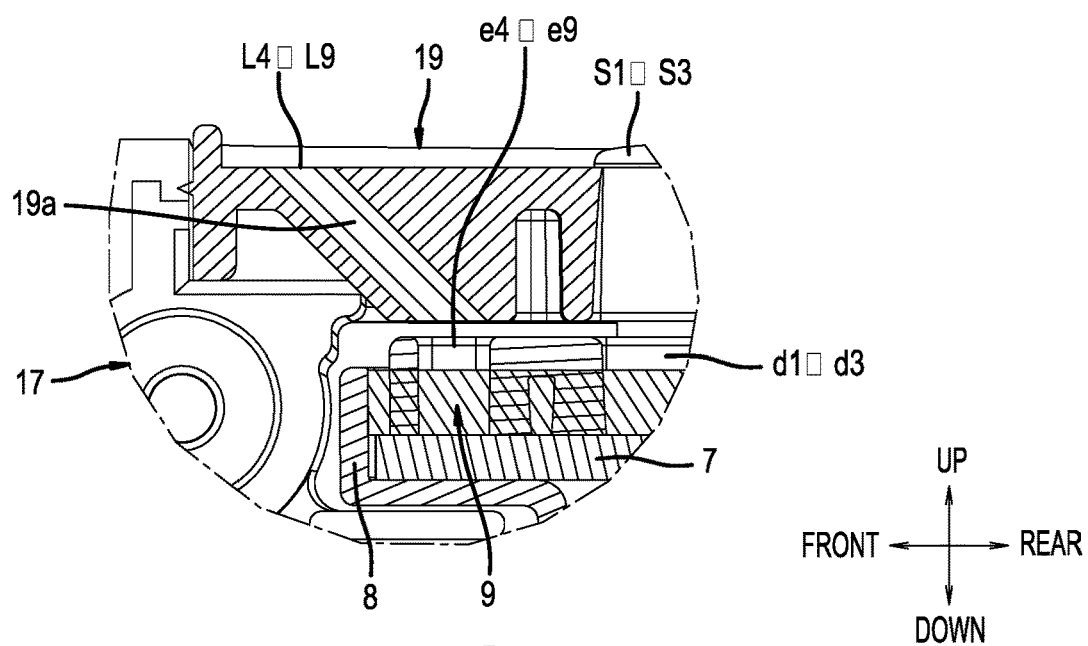
FIG. 5 is an enlarged view of part (V) in FIG. 3 and is a longitudinal-cross-sectional view of the display according to the first embodiment.
Figure 6:
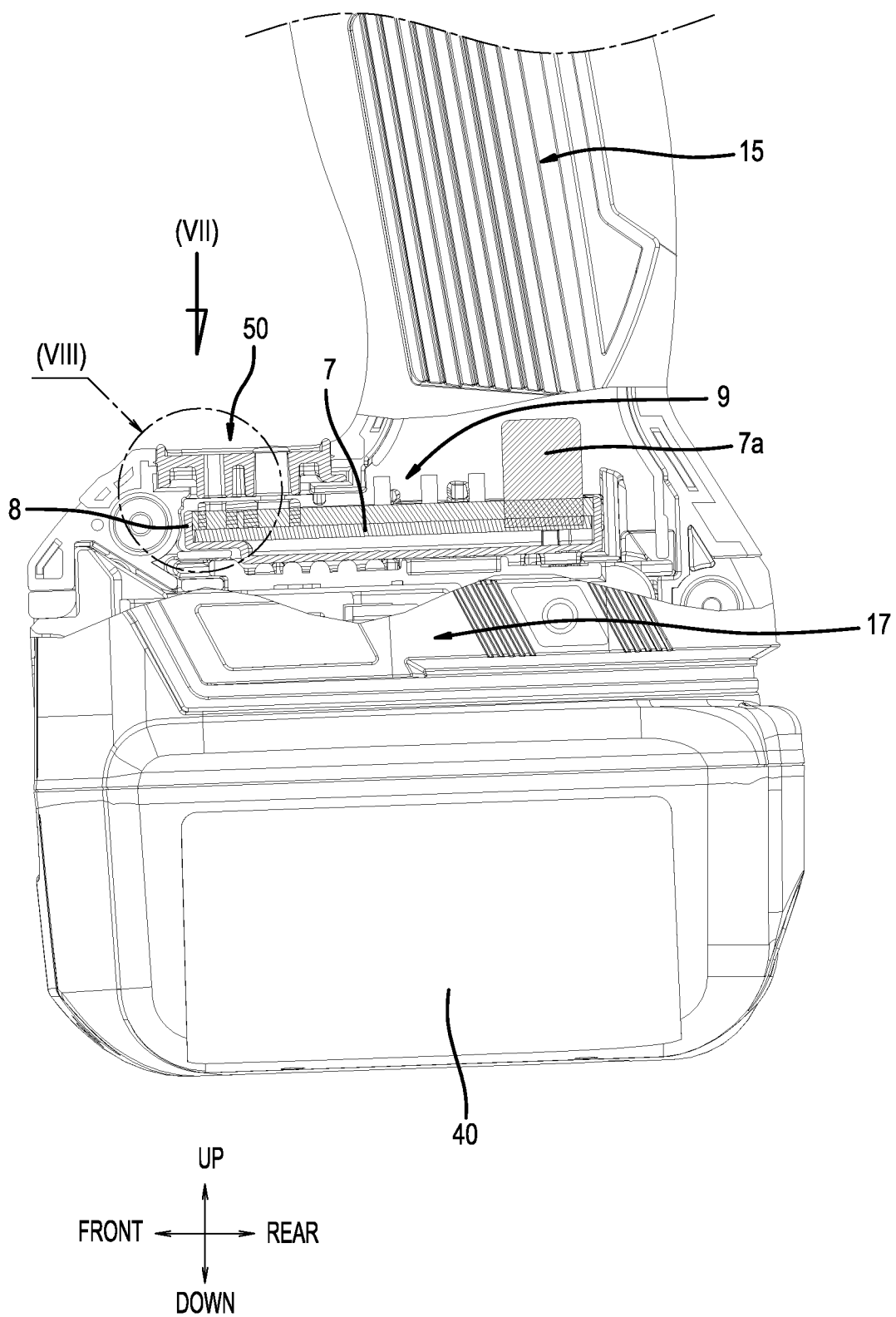
FIG. 6 is a left-side view of the power-supply unit.

As shown in FIG. 3 to FIG. 5, the front part of the display 19 is disposed such that it projects forward from a front end of the controller 9 (or from the control board 7). Three switch parts (switches) S1, S2, S3 and a total of nine light-emitting parts L1-L9 are provided on the display 19. The three switch parts S1, S2, S3 are disposed in a left-right, transversely lined-up state along a rear-end side of the display 19. Three of the light-emitting parts L1-L3 are disposed in a left-right, transversely lined-up state between the switch part S1 and the switch part S2. The remaining six light-emitting parts L4-L9 are disposed in a left-right, transversely lined-up state along a front-end side of the display 19. The three light-emitting parts L1-L3 are disposed in a left-right, transversely lined-up state on the rear side of the display 19 and constitute a rear-side light-emitting-part row, and the six light-emitting parts L4-L9 are disposed in a left-right, transversely lined-up state on a front side of the display 19 and constitute a front-side light-emitting-part row.

Figure 7:
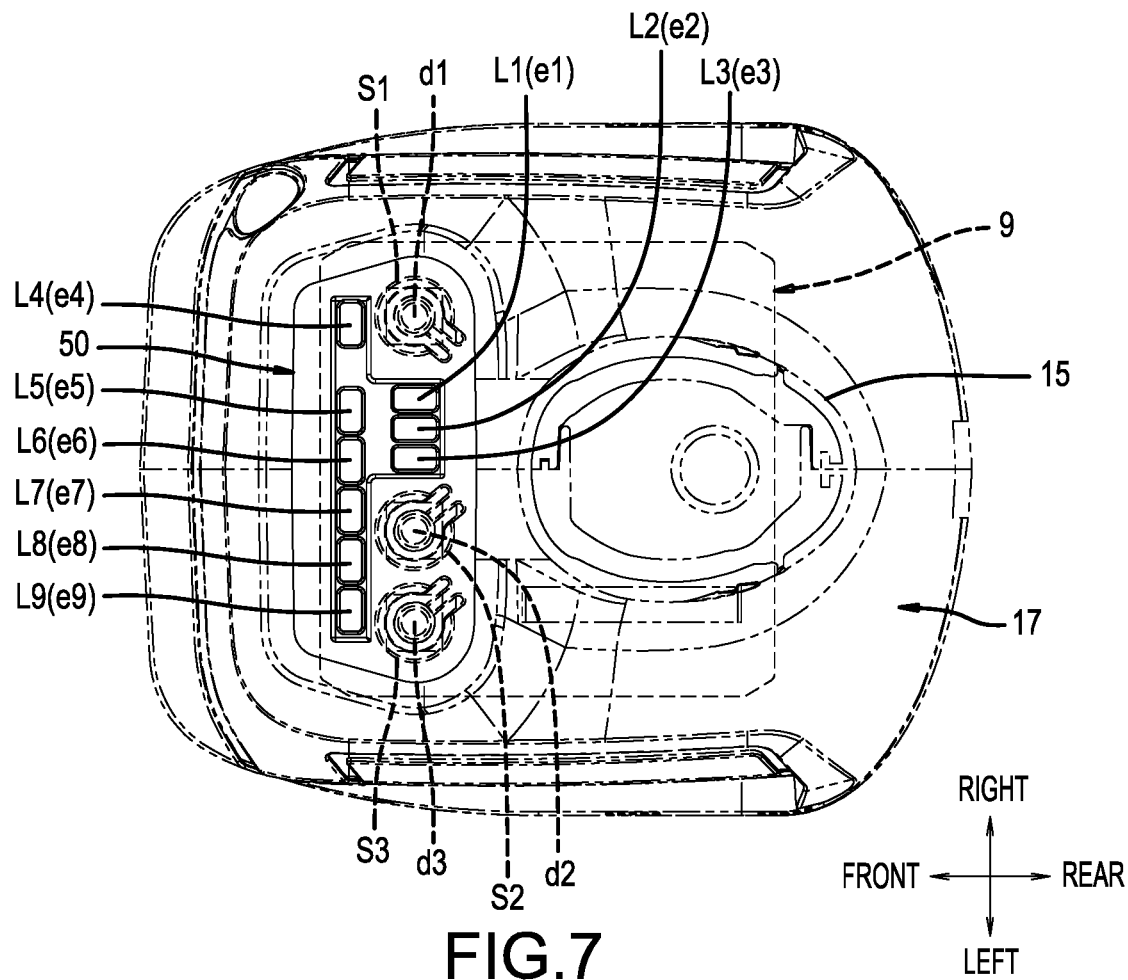
FIG. 7 shows the power-supply unit, viewed from the direction of arrow (VII) in FIG. 6, and is a plan view of the display according to a second embodiment.
Figure 8:
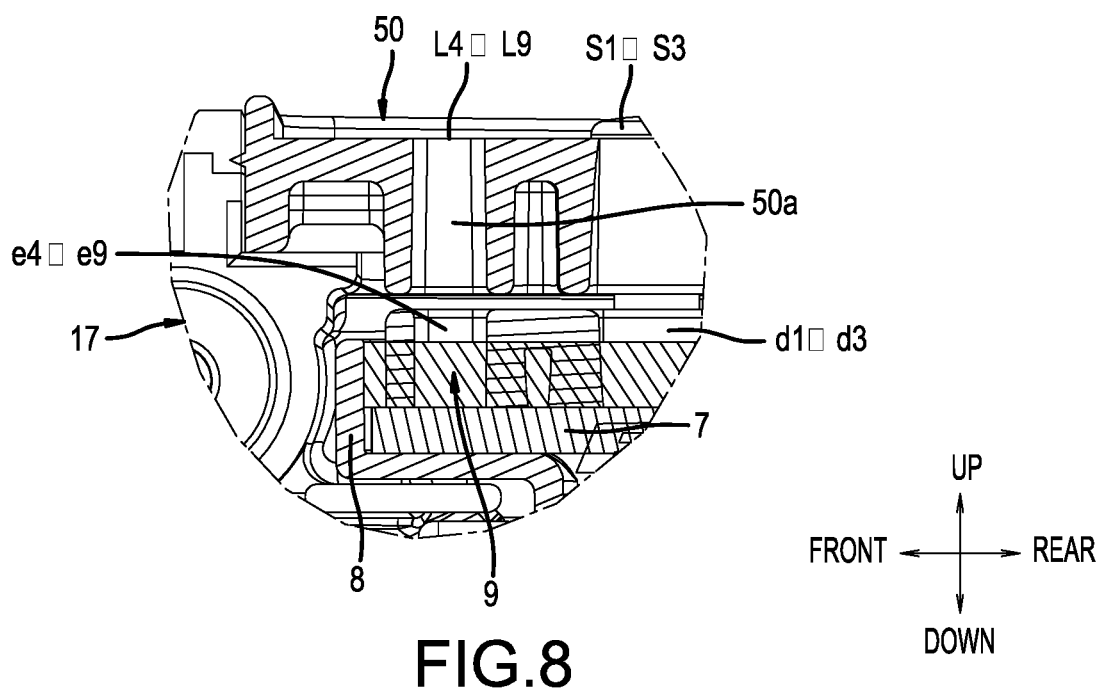
FIG. 8 is an enlarged view of part (VIII) in FIG. 6 and is a longitudinal-cross-sectional view of the display according to the second embodiment.

Three push-button switches d1, d2, d3, which respectively correspond to the switch parts S1, S2, S3, are installed on the control board 7 of the controller 9. The switch parts S1, S2, S3 are disposed directly above the three push-button switches d1, d2, d3. If any of the switch parts S1, S2, S3 is pressed using a fingertip, then the corresponding push-button switch d1, d2, d3 is turned ON/OFF. As shown in FIG. 4 and FIG. 7, in each of the switch parts S1, S2, S3 a columnar-body portion is positioned directly above the corresponding push-button switch d1, d2, d3, and this columnar-body portion is supported by the display 19 via a hinge part. Therefore, as viewed from the hinge part, the columnar-body portion is disposed such that it is tilted to the left or right, thereby achieving a compact design in the front-rear direction of the display 19.

Three LEDs e1, e2, e3 are installed (mounted) on the control board 7 in correspondence with the light-emitting parts L1-L3 disposed between the switch part S1 and the switch part S2. The light-emitting parts L1, L2, L3 are disposed directly above the LEDs e1, e2, e3, respectively. The light emitted from the LEDs e1, e2, e3 is radiated to the corresponding light-emitting parts L1, L2, L3, and thereby the light-emitting parts L1, L2, L3 are illuminated to indicate the turned ON state.

Six LEDs e4-e9 are installed in a left-right, transversely lined-up state along a front-end edge of the control board 7. As shown in FIG. 4, the six light-emitting parts L4-L9 are located at positions shifted to the front side with respect to the six LEDs e4-e9. As shown in FIG. 5, light emitted from the LEDs e4-e9 is respectively radiated to the corresponding light-emitting parts L4-L9 via light-conducting parts 19a, which are provided such that they are tilted diagonally upward to the front side. The six light-emitting parts L4-L9, which are disposed at positions shifted to the front side via the light-conducting parts 19a, are disposed at positions at which they project forward from the front end of the controller 9.

According to the display 19 configured as described above, the display surface area of the display 19 can be enlarged toward the front, and therefore a greater number of light-emitting parts, switch parts, etc. can be disposed without impairing visibility and ease of operation.

In addition, because the display 19 is configured such that it extends on the side opposite the grip part 15, i.e. the front side, the hand that grips the grip part 15 does not get in the way and make it difficult to see the display 19, and thereby the visibility of the display 19 can be ensured.

Furthermore, because the display 19 and the controller 9 are configured such that they are assembled to (mounted on) the power-supply unit 17 as separate components from one another, it is possible to avoid the problem in which the ease-of-handling and the ease-of-assembling of these components would be impaired owing to the display 19 being assembled to (mounted on) the controller 9 such that it projects in the surface direction.

Various modifications can be added to the embodiment as explained above. For example, in FIG. 6 to FIG. 8, a display 50 according to a second embodiment is illustrated. Members and structural elements that do not require modification are identified by the same reference numerals, and explanations thereof are therefore omitted. The display 50 according to the second embodiment also has a substantially trapezoidal-flat-plate shape in which the front side is the short side. The display 50 includes the three switch parts S1, S2, S3 and the total of nine light-emitting parts L1-L9. The three switch parts S1, S2, S3 are disposed in a left-right, transversely lined-up state along the rear-end side of the display 19. The three light-emitting parts L1-L3 are disposed in a left-right, transversely lined-up state between the switch part S1 and the switch part S2. The remaining six light-emitting parts L4-L9 are disposed directly above the LEDs e4-e9 via light-conducting parts 50a. Consequently, in the display 50 of the second embodiment, the light-emitting parts L4-L9 are disposed left-right, transversely lined up in a fixed open space, which is on the front-row side of the switch parts S1, S2, S3, starting from the front-end edge of the display 50. As a result of this design, an area corresponding to this open space projects forward from the front end of the controller 9. Text corresponding to each of the light-emitting parts L5-L9 is inscribed in this open space or projected area, as described below.

The three push-button switches d1, d2, d3 corresponding to the switch parts S1, S2, S3 are installed on the control board 7 of the controller 9. The switch parts S1, S2, S3 are disposed directly above the three push-button switches d1, d2, d3. If any of the switch parts S1, S2, S3 is pressed using a fingertip, then the corresponding push-button switch d1, d2, d3 turns ON/OFF.

Three of the LEDs e1, e2, e3 are installed on the control board 7 in correspondence with the light-emitting parts L1-L3 disposed between the switch part S1 and the switch part S2. The light-emitting parts L1, L2, L3 are disposed directly above the LEDs e1, e2, e3. Light emitted from each of the LEDs e1, e2, e3 is respectively radiated to its corresponding light-emitting part L1, L2, L3, and thereby the corresponding light-emitting part L1, L2, L3 is illuminated to indicate the turned ON state.

Figure 9:
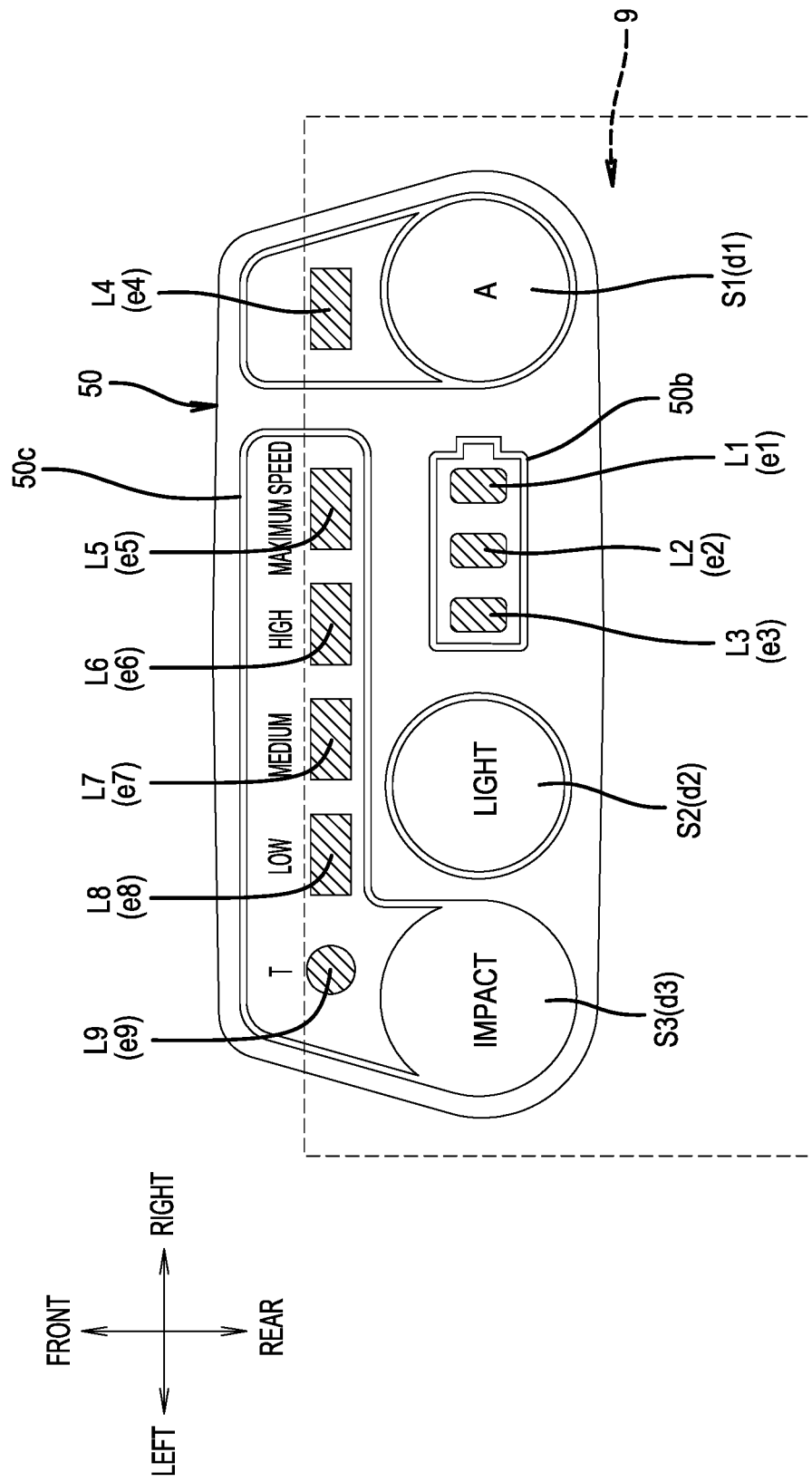
FIG. 9 is a plan view of the display according to the second embodiment.
Figure 10:
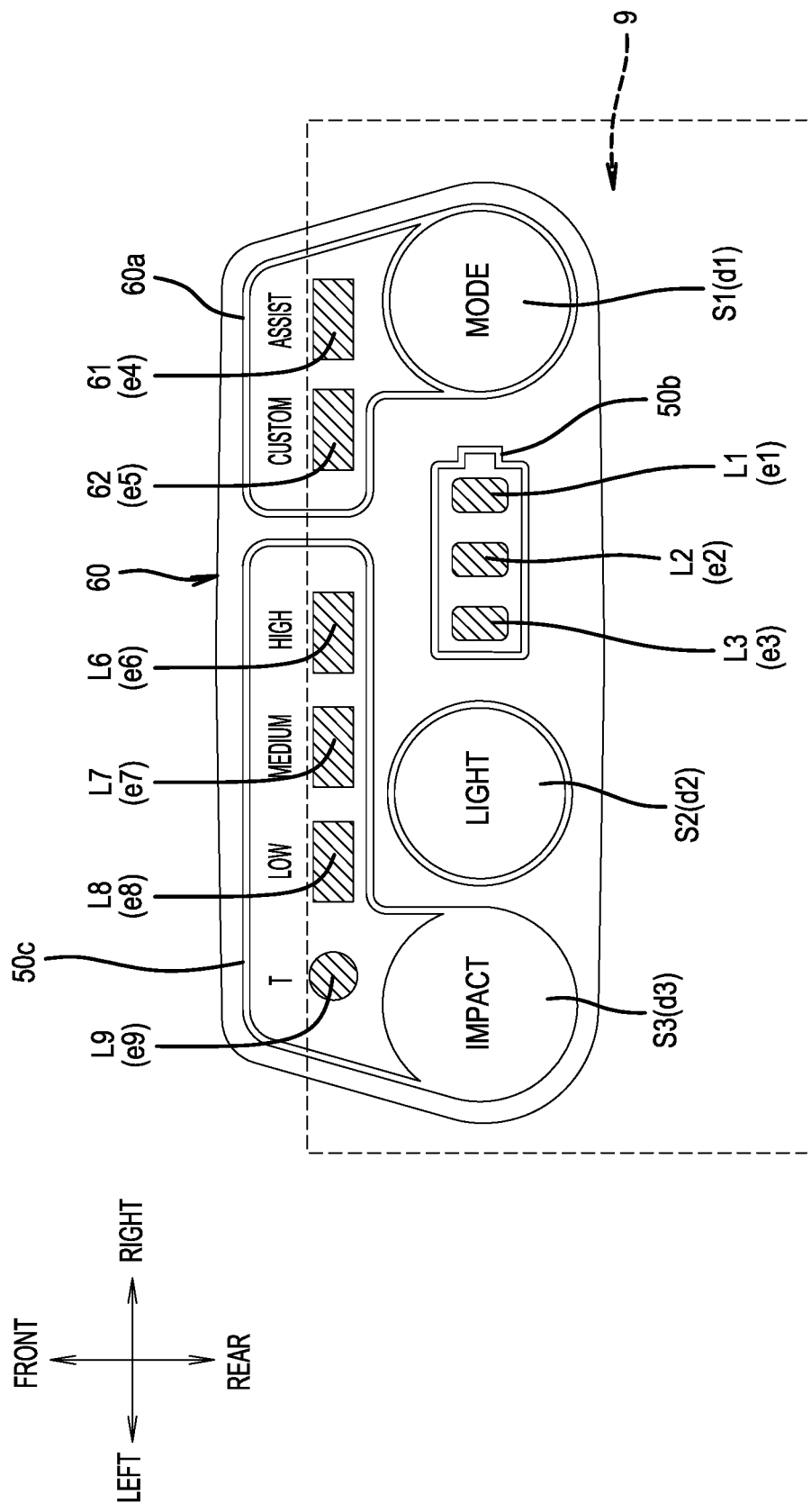
FIG. 10 is a plan view of the display according to a third embodiment.

In the second embodiment, the specific display contents (displayed information) of the display 50 are shown in FIG. 9. The letter "A" is printed on the switch part S1. If the switch part S1 is pressed, then the light-emitting part L4 emits light and thereby communicates that the operation mode of the power tool 1 has been switched to the "A-mode", which stands for "assist mode" or "easy-to-use" mode. When the operation mode is switched to the A-mode, the electric motor initially rotates at low speed to perform slow screw tightening with good control. After the tool starts to impact because the screw-tightening load has become large (exceeded a load threshold), the electric motor is rotated at a higher speed until it reaches its maximum speed and thus the impact force is increased. Thus, the A-mode ensures that reliable screw tightening is performed. If the switch part S1 is pressed once again, then the light-emitting part L4 turns OFF and the A-mode is canceled.

The word "LIGHT" is printed on the switch part S2. If the switch part S2 is pressed, which switch part S2 functions as the illumination switch, then the illumination device 5 can be switched between the ON state and the OFF state. In the ON state of the illumination device 5, if the trigger 16 is pulled (squeezed), then the illumination device 5 turns ON. If the trigger 16 is released, then the illumination device 5 turns OFF after a fixed time. By turning the illumination device 5 ON, the work area becomes brightly illuminated and thereby screw-tightening work can be performed rapidly and reliably in dark locations, or the like. In the OFF state of the illumination device 5, the illumination device 5 does not turn ON even if the trigger 16 is pulled. When the trigger 16 has been pulled, if the illumination device 5 is turned ON, it can be confirmed that the illumination device 5 is in the ON state, and if the illumination device 5 is not turned ON, it can be confirmed that the illumination device 5 is in the OFF state.

The remaining charge level of the battery pack 40 is communicated by the three light-emitting parts L1, L2, L3 disposed between the switch part S1 and the switch part S2. The three light-emitting parts L1, L2, L3 are surrounded by a border 50b, which is shaped like the outline of a dry-cell battery and is a remaining-charge level indicator of the battery pack 40 that can be distinguished (understood) at a glance. If the remaining charge level of the battery pack 40 is sufficient, for example, 50 percent or more, then the three light-emitting parts L1, L2, L3 are all turned ON (illuminated), and the number of the light-emitting parts L1, L2, L3 that are turned ON (illuminated) decreases as the remaining charge level decreases. When only one light-emitting part L3 is turned ON (illuminated), the remaining charge level of the battery pack 40 is low, for example, less than 20 percent, and thereby the need for charging is communicated.

The word "IMPACT" is printed on the switch part S3. If the switch part S3 is pushed, then the operation of the power tool 1 is switched to the "IMPACT" mode. Five of the six light-emitting parts L5-L9 in the frontmost row (i.e. excluding the light-emitting part L4 corresponding to the A-mode) are surrounded by a border 50c, in which the switch part S3 is displayed as the origin. The right-most four of the five light-emitting parts L5-L8 turn ON (are illuminated) based on the magnitude of the impact force selected by the user. The legends "Maximum Speed," "High," "Medium," and "Low" are printed, in order from the right side to the left side, on the front side of (i.e. adjacent to) the four light-emitting parts L5-L8. The letter "T" is printed on the front side of (i.e. adjacent to) the remaining one light-emitting part L9 in the frontmost row.

If the switch part S3, on which the word "IMPACT" is printed, is pressed and the light-emitting part L9, on which the letter "T" is printed, emits light, then the operation mode of the power tool 1 has been switched to the "T-mode". The "T-mode" is the operation mode in which it is assumed that tightening work is being performed for a so-called self-drilling screw, wherein the screw tightening is initially performed using a high-speed rotation, which is suited for drilling with a self-drilling screw tip, so that the initial drilling is performed rapidly. When the tool starts to tighten the screw into the workpiece and thus the screw-tightening load becomes larger, impacts start, the electric motor 20 automatically switches to medium-speed rotation and the number of impacts (the impact force) is restricted. In the screw-tightening final stage, restricting the impact force makes it possible to prevent screw breakage and prevent a screw-head from separating from the screw body (thread), that is, a so-called cam out.

If the switch part S3 is pushed in the "T-mode", then the light-emitting parts L5-L8 sequentially turn ON (illuminate), with each press, in the order of: L5 ("Maximum Speed") L6 ("High"), L7 ("Medium") L8 ("Low"). If the light-emitting part L5 is turned ON (illuminated), then the output-rotational speed of the electric motor 20 changes to its maximum speed and the impact force changes to the maximum. With each subsequent press of the switch part S3, the output-rotational speed of the electric motor 20 decreases and the impact force changes (reduces) in the following order: "High" "Medium" "Low." Thus, the output-rotational-speed ranges of the electric motor 20 can be switched in four stages, and thereby the magnitude of the impact force can be switched in four stages in accordance with the length of the screw, the material (hardness) of the workpiece, and the like.

FIG. 14 to FIG. 17 show the basic control states of the rotational speed of the electric motor 20 in each operation mode. In the impact mode as shown by polygonal line (1) in FIG. 14, the rotational speed of the electric motor 20 reaches its maximum-rotational speed r1 (rpm) at time t1 after the start-up in the maximum-speed-impact mode, in which the four light-emitting parts L5, L6, L7, L8 are all turned ON (illuminated). In the maximum-speed-impact mode, the rate of increase (acceleration) of the rotational speed is set to 1 (%/ms). In the maximum-speed-impact mode, the rotational speed of the electric motor 20 during forward rotation (during screw tightening) coincides with the rotational speed of the electric motor 20 during reverse rotation. The maximum-rotational speed r1 can be set to, for example, 3,000 (rpm).

Figure 15:
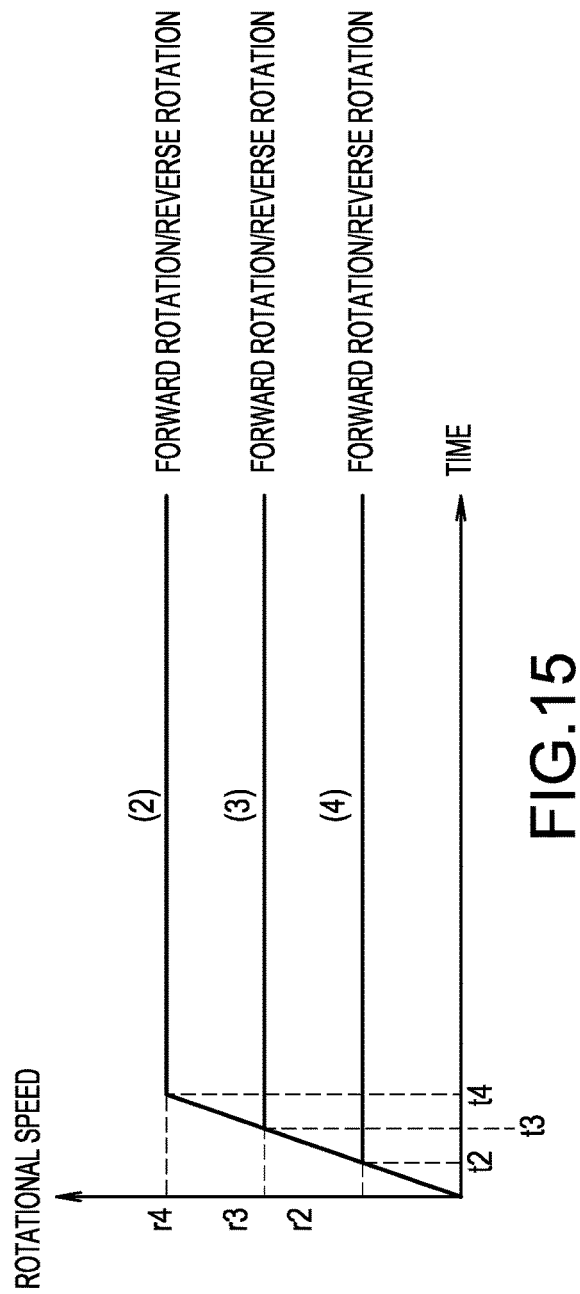
FIG. 15 is a line graph that shows variations of the rotational speed of the electric motor, in which polygonal line (2) shows a "High" impact mode, polygonal line (3) shows a "Medium" impact mode, and polygonal line (4) shows a "Low" impact mode.

In the impact mode as shown by polygonal line (2) in FIG. 15, the rotational speed of the electric motor reaches r4 (rpm) at time t4 after start-up in the high-impact mode, in which the three light-emitting parts L6, L7, L8 are turned ON (illuminated). In the medium-impact mode, in which the two light-emitting parts L7, L8 are turned ON (illuminated) in the impact mode, the rotational speed of the electric motor 20 reaches r3 (rpm) at time t3 after start-up, as shown by polygonal line (3) in FIG. 15. In the low-impact mode, in which only the one light-emitting part L8 is turned ON (illuminated), the rotational speed of the electric motor 20 reaches r2 (rpm) at time t2 after start-up as shown by polygonal line (4). In each mode, that is, in the "High," "Medium," and "Low" impact modes, the acceleration is set to 3 (%/ms). In addition, in each mode, that is, "High," "Medium," and "Low," changes in the rotational speed during forward rotation and during reverse rotation coincide. The rotational speeds r2, r3, r4 can be set to, for example, 900 (rpm), 1,800 (rpm), and 2,800 (rpm), respectively. It is noted that the words "High," "Medium," and "Low" optionally may be replaced with "Hard", "Medium" and "Soft," respectively.

Figure 16:
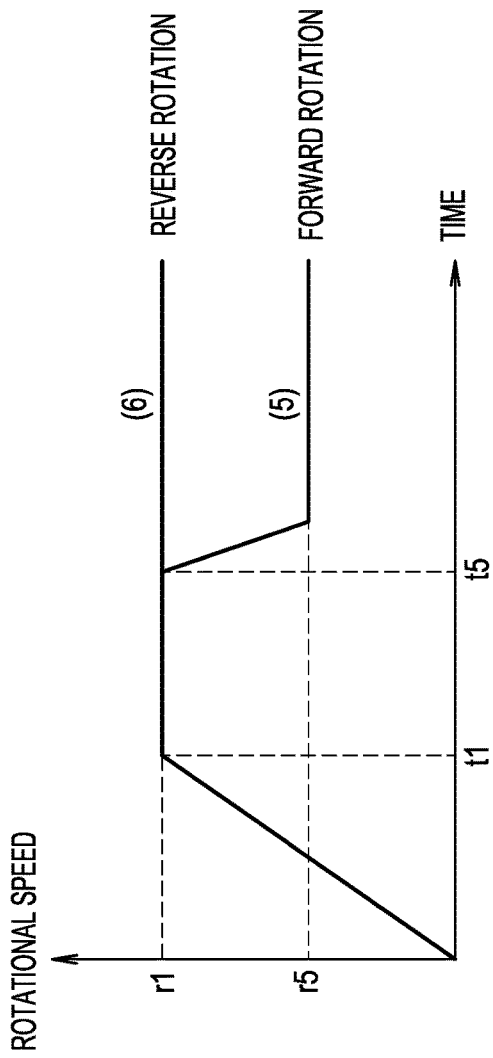
FIG. 16 is a line graph that shows variations of the rotational speed of the electric motor, in which polygonal line (5) shows when rotation is forward in a T-mode, and polygonal line (6) shows when rotation is reverse in the T-mode.

FIG. 16 shows the changes in the rotational speed of the electric motor 20 in the "T-mode," in which the light-emitting part L9 is turned ON (illuminated) in the impact mode. During forward rotation in which screw tightening is performed in the T-mode, the rotational speed of the electric motor 20 reaches its maximum-rotational speed r1 (rpm) at time t1 after start-up, as shown by polygonal line (5). In the stage after time t5, by which the impact count has reached two at the maximum-rotational speed r1 (rpm), the rotational speed of the electric motor 20 decelerates to r5 (rpm), and thereby the impact force is restricted. During reverse rotation as shown by polygonal line (6), after the maximum-rotational speed has been reached at the same acceleration, the rotational speed of the electric motor 20 is maintained at the maximum-rotational speed r1 (rpm) regardless of the impact count. Furthermore, the acceleration until the maximum-rotational speed r1 (rpm) is reached is set to 1 (%/ms), the same as in the maximum-speed mode (FIG. 14), both during forward rotation and during reverse rotation. The rotational speed r5 (rpm) can be set to, for example, 1,400 (rpm).

Figure 17:
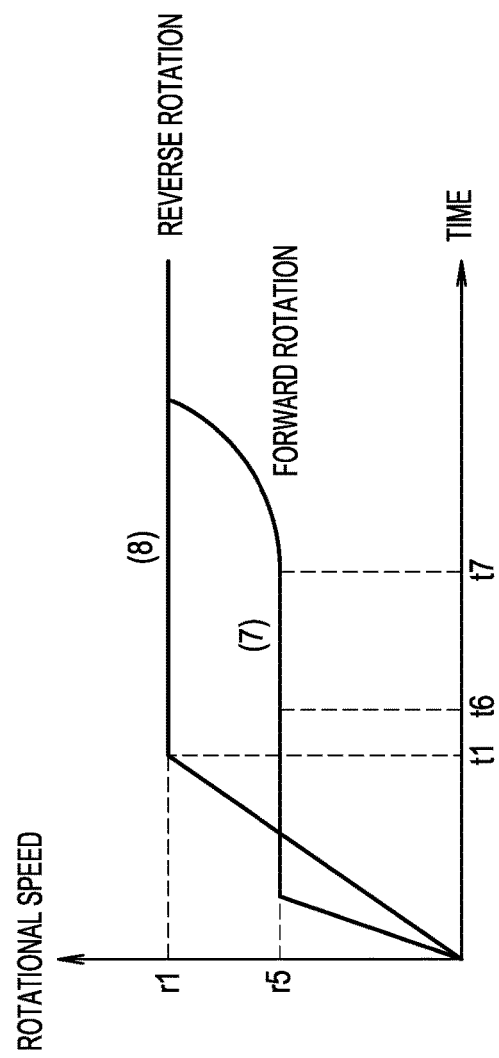
FIG. 17 is a line graph that shows variations of the rotational speed of the electric motor, in which polygonal line (7) shows when rotation is forward in an "A-mode", and polygonal line (8) shows when rotation is reverse in the "A-mode".

FIG. 17 shows the changes in the rotational speed of the electric motor 20 in the "A-mode", in which the light-emitting part L4 is turned ON (illuminated). During forward rotation, in which screw tightening is performed in the "A-mode", the speed is increased at a post-startup acceleration of 3 (%/ms) as shown by polygonal line (7), and a low-speed state is maintained after rotational speed r5 (rpm) has been reached. At the rotational speed r5 (rpm), the impact count is counted for the first time at, for example, t6, and the impact count is counted for the fifteenth time at t7; at that point in time, the rotational speed of the electric motor 20 rises quadratically until it reaches the maximum-rotational speed r1 (rpm), and thereby the impact force increases. During reverse rotation as shown by polygonal line (8), the speed is increased at an acceleration of 1 (%/ms) and reaches the maximum-rotational speed r1 (rpm) after time t1; subsequently, the maximum-rotational speed r1 (rpm) is maintained. Furthermore, the rotational speed r5 (rpm) in the A-mode may be set to a rotational speed that differs from the rotational speed r5 (rpm) in the T-mode.

In each mode as explained above, the rotational speed of the electric motor 20 is finely controlled in accordance with the type of screw to be tightened, the workpiece in which the screw is screwed in, and the like, and thereby it becomes possible to perform various types of screw tightening with good efficiency.

The display 50 according to the second embodiment as explained above is disposed such that its front side projects forward from the front end of the controller 9. In the second embodiment, the text identifiers corresponding to the light-emitting parts L5-L9 in the frontmost row are disposed at locations projected (located) forward from the front end of the controller 9. Consequently, the displayable surface area of the display 50 increases by an area equal to the portion that is projected forward. Furthermore, by disposing the text identifiers in that projected area, the text identifiers can be disposed without impairing their visibility, or the ease of operation of the switch parts S1-S3, and the like.

Generally speaking, the text identifiers, the luminous displays, and the operation switches of the display are located directly above the push-button switches, the LEDs (light-emitting diodes), and the like installed on the circuit board of the controller. Therefore, if a display having a size that does not project from the controller, as viewed in a planar manner, is disposed according to conventional designs, then it is necessary to dispose the text identifiers, the luminous displays, and the like, or the operation switches within the extent of that surface area. As a result, the number of light-emitting parts, operation switches, and the like that can be disposed on the display is limited.

According to the display 50 of the second embodiment, by enlarging the surface area of the display 50 forward, it is possible to prevent problems, such as the display 50 being concealed by the hand of the user who grasps the grip part 15, from occurring. In addition, by disposing the display 50 such that it projects in the surface direction from the front end of the controller, the text identifiers, the luminous displays, and the like can be disposed also in this projected portion and thereby it becomes possible to dispose a greater number of text identifiers, luminous displays or operation switches without reducing the visibility and the ease of operation thereof. In the second embodiment, the one illumination switch S2 and the two mode-changing switches S1, S3 can be disposed on the display 50.

The layout of the various mode-changing switches or the light-emitting parts of the display 50 can be modified as appropriate. In a display 60 of a third embodiment shown in FIG. 10, the word "MODE" is printed on the switch part S1 instead of the letter "A" of the second embodiment. Two light-emitting parts 61, 62 are disposed inside a border 60a, in which the switch part S1 serves as the origin. The light-emitting part 61 is a light-emitting part that corresponds to the LED e4 on the control board 7, and the light-emitting part 62 is a light-emitting part that corresponds to the LED e5 on the control board 7. In the third embodiment, the LED e5 on the control board 7 is shifted toward the LED e4 side (the right side in FIG. 10). The word "ASSIST" is printed forward of and adjacent to the light-emitting part 61, and the word "Custom" is printed forward of an adjacent the light-emitting part 62. The words "ASSIST" and "Custom" are disposed in an area that projects forward from the front end of the controller 9.

If the switch part S1, on which the word "MODE" is printed, is pressed, then the light-emitting part 61, on which the word "ASSIST" is printed, emits light. If the switch part S1 is pressed once more, then the light-emitting part 62, on which the word "Custom" is printed, emits light. The "ASSIST" mode corresponds to the "A-mode" of the preceding embodiments, in which impacts are initially performed at low-speed rotation and are automatically switched to high-speed rotation after a fixed count of impacts; thereby, even an inexperienced worker can perform the screw tightening quickly and reliably. In the "Custom" mode, the user can switch to an arbitrarily set rotational speed of the electric motor 20.

The same as in the second embodiment, the remaining charge level of the battery pack 40 is indicated by the three light-emitting parts L1-L3 surrounded by the border 50b. In addition, switching to the T-mode is performed by the switch part S3, on which the word "IMPACT" is printed. In the T-mode in the third embodiment, the output-rotational speed of the electric motor 20 is switched in three stages, and thereby the impact force is switched in three stages, which is communicated by the light-emitting parts L6, L7, L8, which have the words "High," "Medium," and "Low" printed adjacent thereto, emitting light. The words "High," "Medium," and "Low" of the light-emitting parts L6, L7, L8 and the letter "T" of the light-emitting part L9 are all printed in the area of the display 60 that projects forward from the front end of the controller 9.

Figure 11:
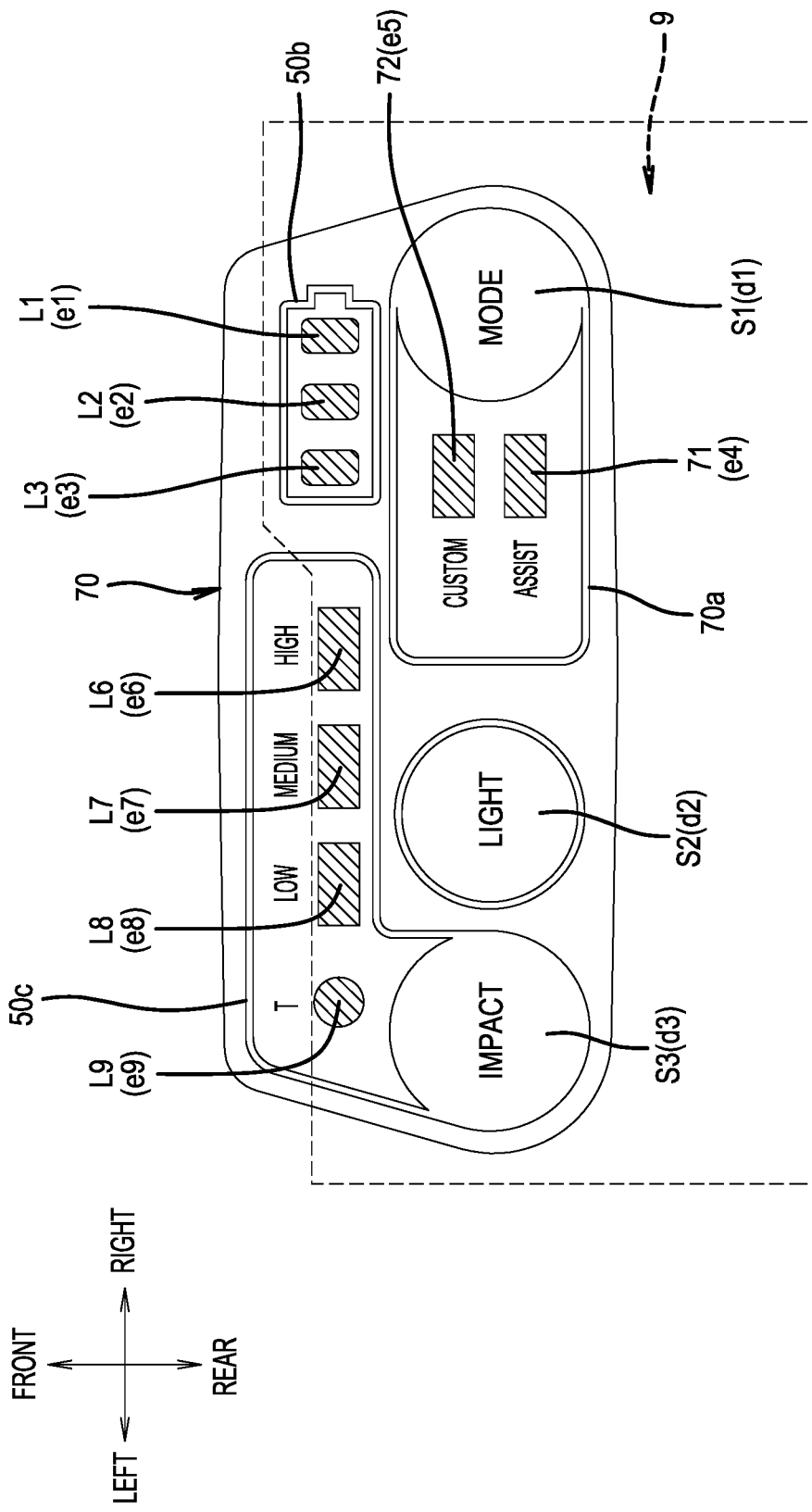
FIG. 11 is a plan view of the display according to a fourth embodiment.

FIG. 11 shows a display 70 of a fourth embodiment that differs, with respect to the location of the remaining-charge-level indicator part of the battery pack 40, from the display 60 of the third embodiment. Members and structural elements that do not require modification are identified by the same reference numerals as in the first through third embodiments, and explanations thereof are therefore omitted. In the fourth embodiment, the light-emitting parts L1-L3, which indicate (show) the remaining charge level of the battery pack 40, are likewise surrounded by the border 50b and are disposed on the front-row side. Consequently, the LEDs e1-e3 are installed on the control board 7 along the front end thereof.

In the fourth embodiment, the location of the switch part S1, on which the word "MODE" is printed, is the same as in the third embodiment, but a border 70a extends leftward, with the switch part S1 serving as the origin. A light-emitting part 71, which has the word "ASSIST" printed adjacent thereto, and a light-emitting part 72, which has the word "Custom" printed adjacent thereto, are disposed inside the border 70a. Consequently, the LEDs e4, e5 are installed on the control board 7 on the left side of the push-button switch d1. In the fourth embodiment, the switching function of the switch part S1, on which the word "MODE" is printed, is the same as in the third embodiment, and it is possible to switch between the "ASSIST" mode (A-mode), in which the rotational speed is automatically increased as the screw-tightening load increases, and the "Custom" mode, in which the rotational speed can be set arbitrarily.

Further modifications can be added to each of the embodiments explained above. For example, the third embodiment described an example of a configuration in which the switch part S1, on which the word "MODE" is printed, is disposed on the right side, and the switch part S3, on which the word "IMPACT" is printed, is disposed on the left side. However, a configuration may be adopted in which the locations of the switch part S1 and the switch part S3 are reversed. A configuration may be adopted in which the light-emitting parts L1-L3, which indicate (show) the remaining charge level of the battery pack 40, and the switch part S2, on which the word "LIGHT" is printed, are reversed.

In addition, examples of configurations were described in which the displays 19, 50, 60, 70 each have a trapezoidal shape in which the front side is the short side. However, the present disclosure can likewise be applied to displays of other shapes, such as a trapezoidal shape in which the rear side is the short side, a rectangular shape, a parallelogram, a round shape, an oval shape, etc.

The display 19 (50, 60, 70) exemplified a configuration that includes two mode-changing switches (the switch parts S1, S3), the remaining-charge-level indicators L1-L3 of the battery pack 40, the ON/OFF-changing switch (the switch part S2) of the illumination device 5, and the displays L4-L9 that display various states. However, it is also possible to add mode-changing switches (switch parts) having other functions or to add other light-emitting parts.

The shape of each of the light-emitting parts L1-L9 is not limited to the rectangular shape as illustrated and can be modified to other shapes, such as a trapezoidal shape, a circular shape, an oval shape, or the like. In addition, the illuminating colors of the light-emitting parts L1-L9 can be arbitrarily changed to other colors, such as red, blue, green, etc. It is also possible to group the functions and to set a different illuminating color for each group.

Figure 12:
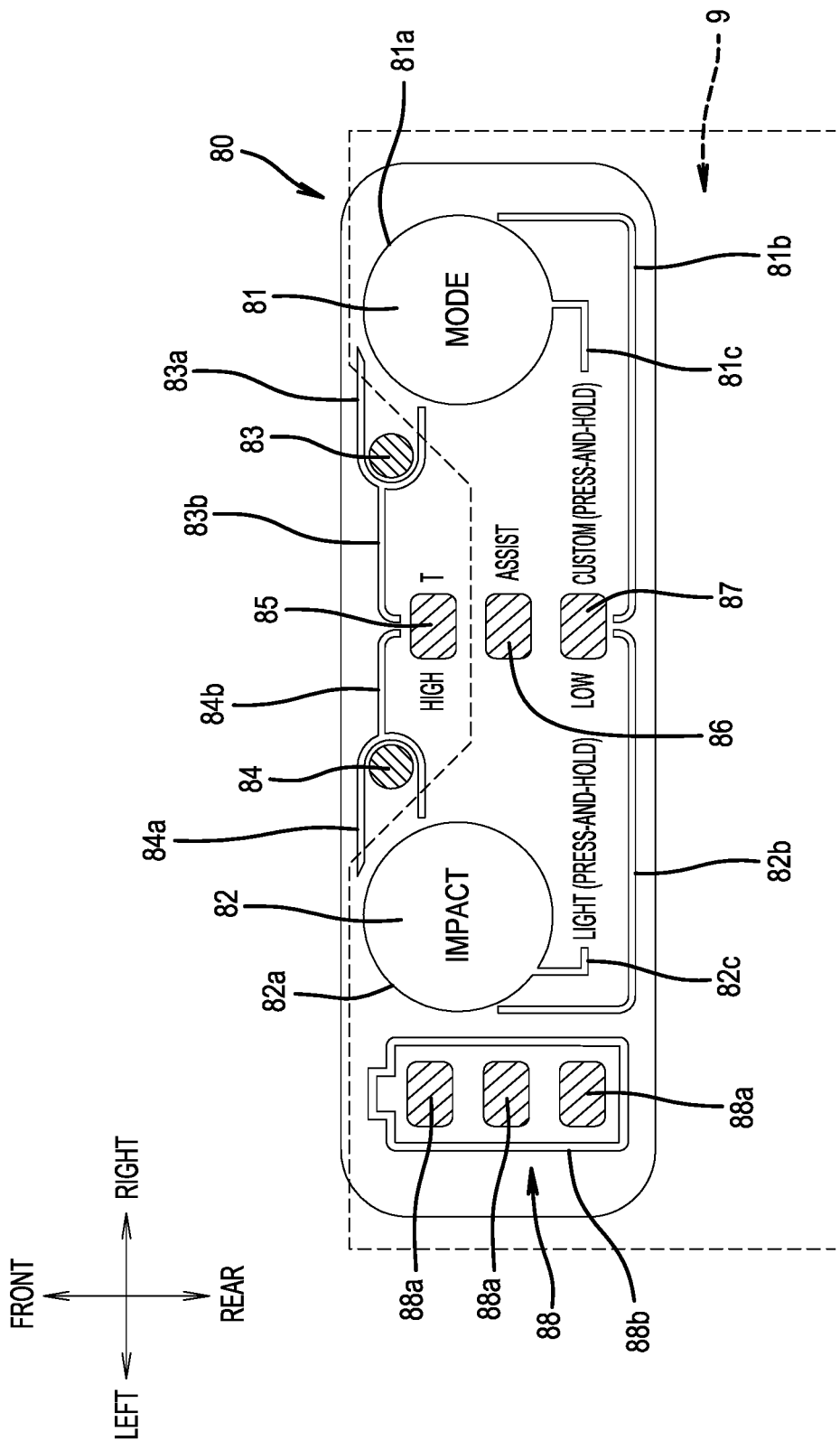
FIG. 12 is a plan view of the display according to a fifth embodiment.

FIG. 12 shows a display 80 according to a fifth embodiment. The display 80 has a rectangular flat-plate shape in which the corner parts have an arcuate (rounded) shape and comprises: a switch part 81, on which the word "MODE" is printed; a switch part 82, on which the word "IMPACT" is printed; two circular light-emitting parts 83, 84; three rectangular light-emitting parts 85, 86, 87; and a battery pack remaining-charge-level indicator part 88. The switch part 81 is disposed in the vicinity of the right end of the display 80, and the remaining-charge-level indicator part 88 is disposed in the vicinity of the left end of the display 80. The remaining-charge-level indicator part 88 has a configuration in which three light-emitting parts 88a, which are lined up in the front-rear direction, are disposed inside a border 88b, which is shaped like the outline of a dry-cell battery. LEDs, which are installed (mounted) on the control board 7, are located directly below the three light-emitting parts 88a. If the remaining charge level of the battery pack 40 is sufficient, then the three light-emitting parts 88a turn ON (are illuminated), and as the remaining charge level becomes low, the number of LEDs turned ON (illuminated) changes to two or one, and thereby the need to recharge is communicated.

The switch part 82 is disposed to the right of the remaining-charge-level indicator part 88. The two circular light-emitting parts 83, 84 are disposed in the vicinity of the front end of the display 80. The light-emitting part 83 is disposed on the left side of the switch part 81, and the light-emitting part 84 is disposed on the right side of the switch part 82. The three light-emitting parts 85, 86, 87 are disposed, in an up-down longitudinally lined-up state at substantially the center of the display 80, between the switch part 81 and the switch part 82.

The switch part 81 is disposed inside a circular switch border 81a. The word "MODE" is printed inside the switch border 81a. If the switch part 81 is pressed, then the circular light-emitting part 83 turns ON and one of the three light-emitting parts 85, 86, 87 turns ON (is illuminated). Owing to the light-emitting part 83 turning ON (being illuminated), the fact that the operation mode of the tool-main-body part 10 is in the switchable state is communicated.

The letter "T" and the words "ASSIST" and "CUSTOM (press-and-hold)" are printed, in order from the upper side, on the right side of the three light-emitting parts 85, 86, 87. If the switch part 81 is pressed once, then the light-emitting part 83 turns ON (illuminates) and the light-emitting part 85, which has the letter "T" printed adjacent thereto, turns ON (illuminates). When the light-emitting part 85 is turned ON (illuminates), the operation mode of the tool-main-body part 10 has been switched to the T-mode. If the switch part 81 is pressed once more, then the light-emitting part 86 turns ON (illuminates) while the light-emitting part 85 turns OFF. When the light-emitting part 86 is turned ON (illuminates), the operation mode of the tool-main-body part 10 has been switched to the ASSIST mode (A-mode). If the switch part 81 is pressed and held, then the circular light-emitting part 83 and the rectangular light-emitting part 87 turn ON (illuminate). Thereby, the operation mode of the tool-main-body part 10 is indicated as having been switched to the CUSTOM mode.

The switch part 82 is disposed inside a circular switch border 82a. The word "IMPACT" is printed inside the switch border 82a. If the switch part 82 is pressed, then the circular light-emitting part 84 turns ON (illuminates), and, of the three light-emitting parts 85, 86, 87, one of the two upper and lower light-emitting parts 85, 87 emits light. Of the three light-emitting parts 85, 86, 87, the word "High" is printed on the left side of the upper side light-emitting part 85, and the word "Low" is printed on the left side of the lower side light-emitting part 87.

If the switch part 82 is pressed, then the light-emitting part 84 turns ON (illuminates) and the light-emitting part 87, which has the word "Low" printed adjacent thereto, turns ON (illuminates). If the switch part 82 is pressed once more, then, in addition to the light-emitting part 87, the upper side light-emitting part 86 turns ON (illuminates). If the switch part 82 is pressed once more while the two light-emitting parts 86, 87 are turned ON, then the light-emitting part 85, which has the word "High" printed adjacent thereto, also turns ON (illuminates). When only the light-emitting part 87, which has the word "Low" printed adjacent thereto, is turned ON (illuminates), the electric motor 20 is controlled to be at low-speed rotation and a low impact force is output. When the light-emitting parts 86, 87 are turned ON (illuminated), the electric motor 20 is controlled to be at medium-speed rotation and a medium impact force is output. When the three light-emitting parts 85, 86, 87 are turned ON (illuminated), the electric motor 20 is controlled to operate at high-speed rotation and the impact force is high.

The words "LIGHT (press-and-hold)" are printed on the rear side (lower side in FIG. 12) of the switch part 82. If the switch part 82, on which the word "IMPACT" is printed, is pressed and held, then the illumination device 5 turns ON and the screw-tightening portion is brightly illuminated; thereby, work in dark locations can be performed with good efficiency. If the switch part 82 is pressed and held once more, then the illumination device 5 turns OFF. The switch part 82, in addition to implementing the impact-force switching function, also serves as a light switch for the illumination device.

The light-emitting parts 83, 84 are surrounded by semicircular, arcuate shaped, dual-line borders 83a, 84a, respectively. The borders 83a, 84a are disposed with left-right symmetry. Owing to the left and right borders 83a, 84a, the relationship between the switch part 81 and the light-emitting part 83 and the relationship between the switch part 82 and the light-emitting part 84 can be understood at a glance, and the ease of operation of the display 80 is thereby increased. Dual-line guide lines 83b, 84b likewise are drawn from the borders 83a, 84a. Both of the guide lines 83b, 84b reach an upper part of the upper-side light-emitting part 85, which has the letter "T" and the word "High" respectively printed on the right and left sides thereof. A dual-line guide line 81b is drawn from the switch border 81a of the switch part 81, on which the word "MODE" is printed. In addition, a dual-line guide line 82b is drawn from the switch border 82a of the switch part 82, on which the word "IMPACT" is printed. Both of the guide lines 81b, 82b reach a lower part of the lower-side light-emitting part 87, which has the words "CUSTOM (press-and-hold)" and "Low" respectively printed on the right and left sides thereof. A dual-line guide line 81c, which has an L shape, is drawn from a lower part of the switch border 81a. The guide line 81c reaches the right side of the words "CUSTOM (press-and-hold)". A dual-line guide line 82c, which has an L shape, is drawn from a lower part of the switch border 82a. The guide line 82c reaches the left side of the words "LIGHT (press-and-hold)". Owing to these guide lines 83b, 84b, 81b, 82b, 81c, 82c, the relationship between the switch parts 81, 82 on one side and the light-emitting parts 85-87 and the text identifiers on the other side can be understood at a glance, and the ease of operation of the display 80 is thereby increased.

As shown in FIG. 12, the display 80 according to the fifth embodiment is also disposed such that its front part is shifted forward with respect to the front-end part of the control board 7. In the fifth embodiment, the light-emitting parts 83, 84, 85 and the letter T and the word "High" are disposed in an area that projects more on the front side than does the front-end part of the control board 7. The light-emitting parts 83, 84, 85 are disposed at locations shifted forward with respect to the LEDs (not shown) installed on the control board 7. The light-emitting parts 83, 84, 85 emit light through light-conducting parts (the light-conducting parts 19a shown in FIG. 5), which are tilted forward. Likewise, LEDs, which are installed on the control board 7, are located directly below the light-emitting parts 86, 87.

Because the light-emitting parts 83, 84, 85 and the letter "T" and the word "High" are disposed in the area of the display 80 that projects forward beyond the front end of the control board 7, it becomes possible, to the extent of that projected portion, to dispose a greater number of switch parts, luminous displays, text identifiers, and the like on the display 80—without impairing the ease of operation and the visibility of the switch parts, the text identifiers, and the like. The remaining-charge-level indicator part 88 may be omitted.

Figure 13:
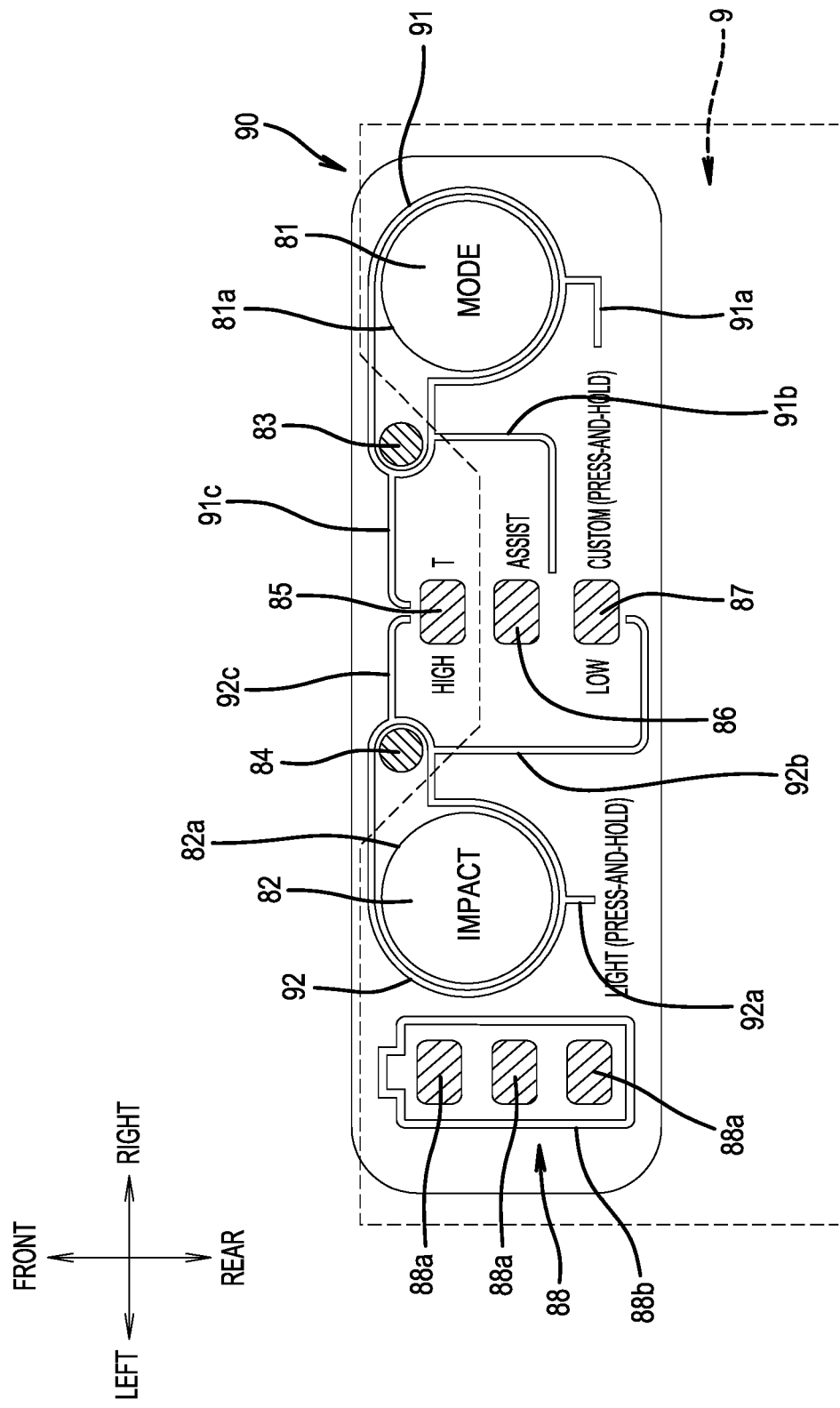
FIG. 13 is a plan view of the display according to a sixth embodiment.
Figure 14:
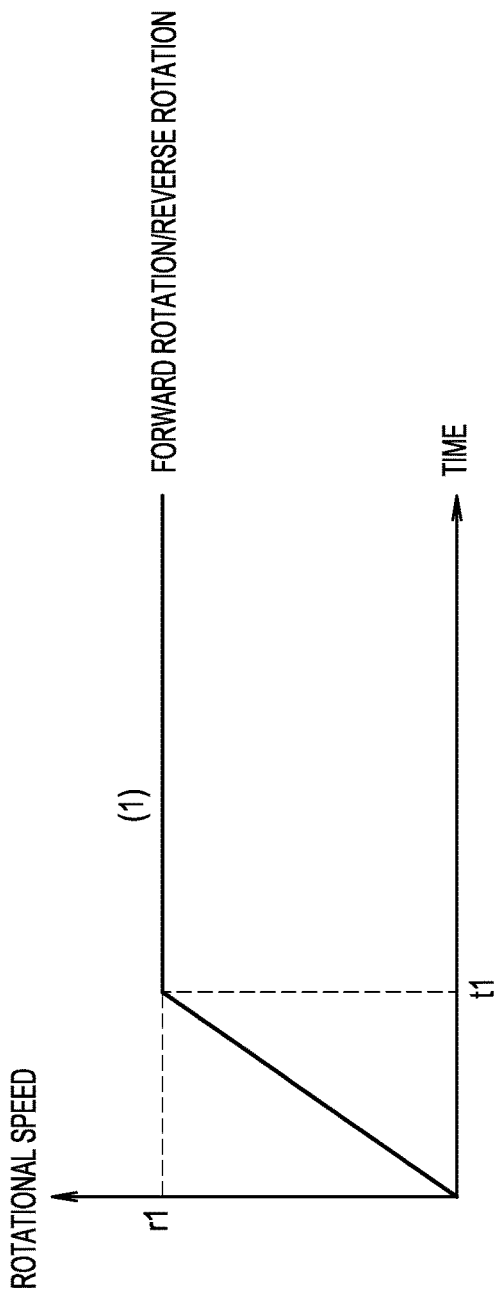
FIG. 14 is a line graph showing the variation of the rotational speed of an electric motor in the "Maximum Speed" impact mode.

A display 90 of a sixth embodiment is illustrated in FIG. 13. The display 90 of the sixth embodiment differs from the display 80 of the fifth embodiment in the layout of the borders to further improve the ease of operation of the mode-switching. The layout of the switch parts 81, 82, the layout of the light-emitting parts 83-87, and the layout of the text identifiers are configured the same as in the fifth embodiment. The remaining-charge-level indicator part 88 of the battery pack 40 is also configured in the same manner. Members and structural elements that do not require modification are identified by the same reference numerals, and explanations thereof are therefore omitted.

In the sixth embodiment, the switch part 81, on which the word "MODE" is printed, and the light-emitting part 83 are surrounded by a common border 91. In addition, the switch part 82, on which the word "IMPACT" is printed, and the light-emitting part 84 are surrounded by a common border 92. The right-side border 91 and the left-side border 92 are each indicated with dual lines and are disposed with left-right symmetry. Dual-line guide lines 91c, 92c, which extend in the transverse direction, are indicated starting from a left-end part of the right-side border 91 and starting from a right-end part of the left-side border 92, respectively. Both of the guide lines 91c, 92c reach the upper part of the upper-side light-emitting part 85, which has the letter "T" and the word "High" respectively printed on the right and left sides thereof.

A dual-line guide line 91a, which has an L shape, is drawn from the lower part of the border part 91. Like the guide line 81c, the guide line 91a reaches the right side of the words "CUSTOM (press-and-hold)". A dual-line guide line 91b, which has an L shape, is likewise drawn from a lower-left part of the border 91. The guide line 91b extends to the space between the word "ASSIST" and the words "CUSTOM (press-and-hold)".

A dual-line guide line 92b extends downward from a lower-right part of the left-side border part 92. The guide line 92b is bent into an L shape, and its tip side reaches below the lower-side light-emitting part 87, which has the words "CUSTOM (press-and-hold)" and "Low" respectively printed on the right and left sides thereof. A short, dual-line guide line 92a is drawn from a lower part of the border part 92. The guide line 92a is directed toward the words "LIGHT (press-and-hold)", which are printed rearward of the guide line 92a. In the sixth embodiment, the words "LIGHT (press-and-hold)" are disposed more on the rear side (the lower side in FIG. 13) than in the fifth embodiment.

According to the display 90 of the sixth embodiment, too, the light-emitting parts 83, 84, 85 and the letter "T" and the word "High", which are at the front part of the display 90, are disposed in an area of the display 90 that projects forward from the front end of the control board 7. Thereby, it becomes possible, to the extent of that portion, to dispose a greater number of switch parts, luminous displays, text identifiers, and the like on the display 90 without impairing the ease of operation and the visibility of the switch parts, the text identifiers, and the like. The same as in the fifth embodiment, the remaining-charge-level indicator part 88 may be omitted.

Figure 18:
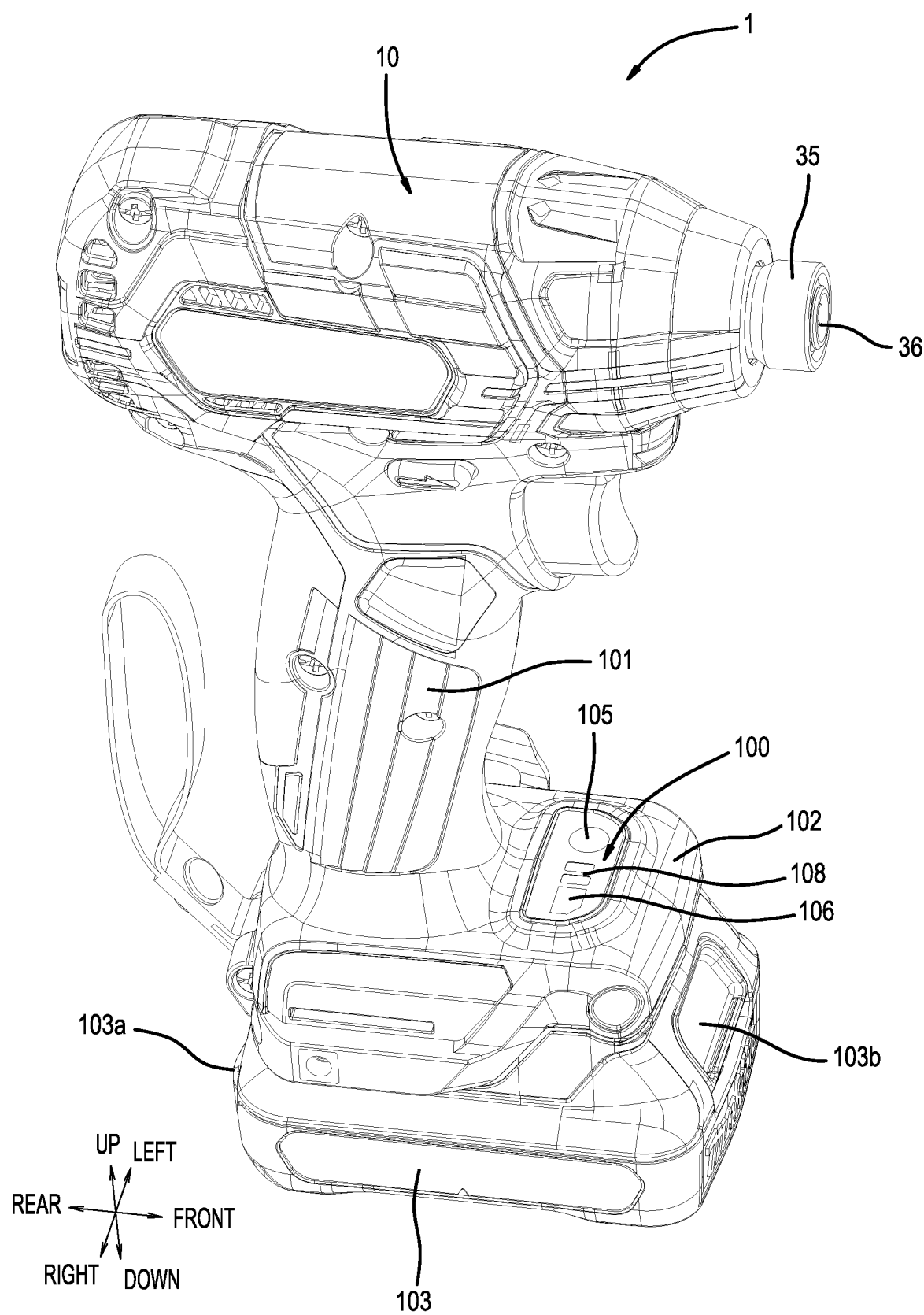
FIG. 18 is an overall oblique view of the power tool, which includes the display, according to a seventh embodiment.

FIG. 18 shows a power tool 1 that comprises a display 100 of a seventh embodiment. As in each of the abovementioned embodiments, an impact driver is shown as an exemplary power tool 1 according to the present teachings. The electric motor 20, the planetary-gear mechanism 30, and the rotary-impact mechanism 32 are built into (disposed within) the tool-main-body part (housing) 10. The output shaft 36 protrudes from the front-end part of the tool-main-body part 10. The tool-retaining part (tool chuck) 35 is provided at the protruding portion of the output shaft 36. Otherwise, structural elements that do not require modification are identified by the same reference numerals, and explanations thereof are therefore omitted.

A grip part (handle) 101 is provided such that it extends downward from the lower surface of the tool-main-body part 10. The same as in each of the abovementioned embodiments, the display 100 is disposed on a front-side upper surface of a power-supply unit 102, which is provided on a lower part of the grip part 101. The power-supply unit 102 principally has a flat-plate shape that projects toward the front side from the lower part of the grip part 101. The power-supply unit 102 according to the seventh embodiment is slightly more compact, with respect to the projected dimension forward and the left-right width dimension, than is the power-supply unit 17 according to the abovementioned first through sixth embodiments.

A slide-mounting type battery pack 103 is likewise mounted on the lower surface of the reduced-size power-supply unit 102. A lithium-ion battery, the external dimensions of which are smaller than those of the battery pack 40 and the output voltage of which is 10.8 V, is used as the battery pack 103 and is mounted on the power-supply unit 102. Although it cannot be seen in FIG. 18, a remaining-charge-level indicator part 103*a* for indicating (showing) the remaining charge level of the battery pack 103 is provided on a rear surface of the 10.8 V, slide-mounting-type battery pack 103. The battery pack 103 can be dismounted (removed or detached) from the power-supply unit 102 by pushing a lock-release button 103*a*, which is provided on a front surface of the battery pack 103, downward and then sliding the battery pack 103 toward the front side. Conversely, the battery pack 103 can be mounted onto the power-supply unit 102 by sliding the battery pack 103 rearward.

Figure 19:
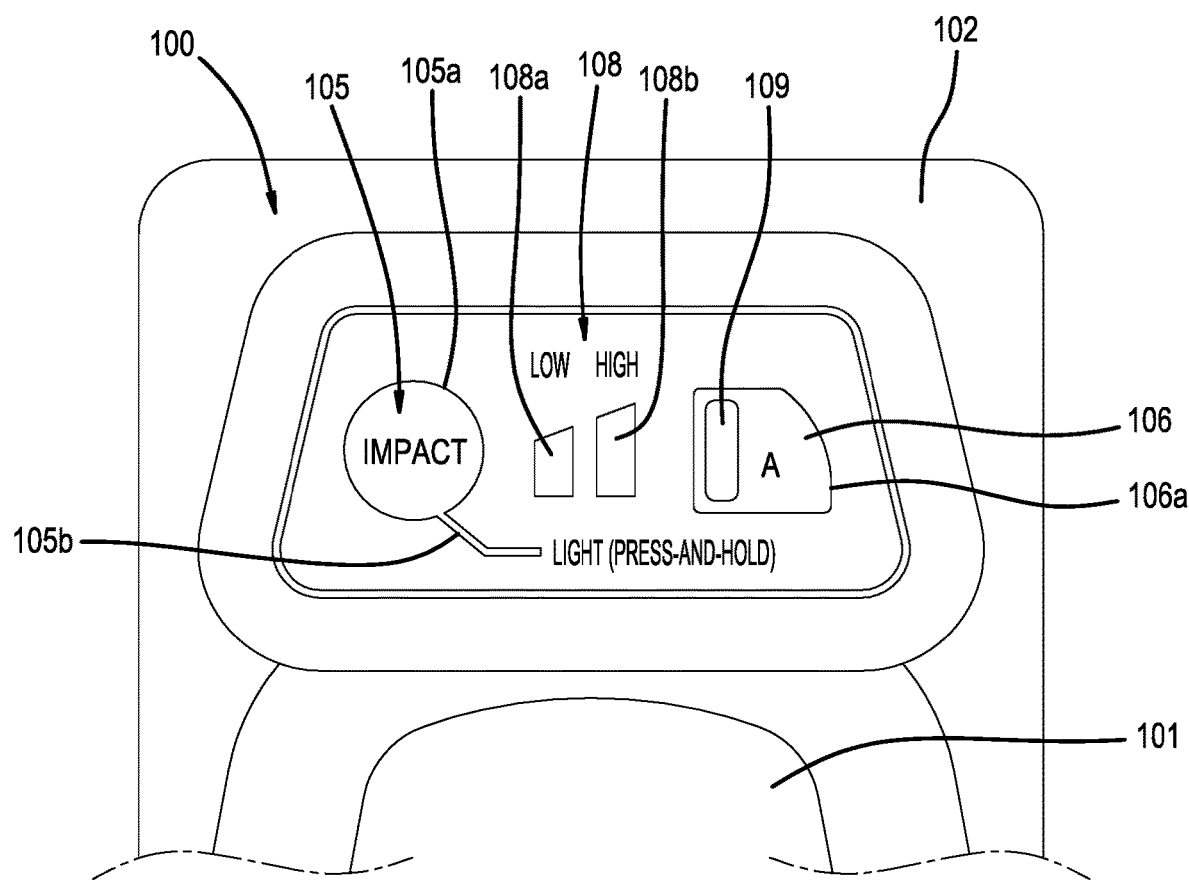
FIG. 19 is a plan view of the display according to the seventh embodiment.
Figure 19:
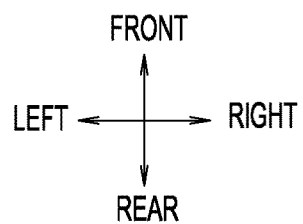

The details of the display 100 are shown in FIG. 19. In the display 100 of the seventh embodiment, the display functions are more simplified. The display 100 comprises a pushbutton-type impact-force-changing switch 105, on which the word "IMPACT" is printed, a mode-display 106, on which the letter "A" is printed, and an impact-force-display 108. The impact-force-changing switch 105 is disposed on the left side of the display 100, and the mode-display 106 is disposed on the right side of the display 100. The impact-force-display 108 is disposed in the space between the impact-force-changing switch 105 and the mode-display 106, which is the center of the display 100. The impact-force-changing switch 105, the mode-display 106, and the impact-force-display 108 are disposed such that they are aligned transversely in the left-right direction.

The impact-force-display 108 comprises two light-emitting parts 108*a*, 108*b*. In each of the two light-emitting parts 108*a*, 108*b*, an LED serves as the light source. If the impact-force-changing switch 105 is pressed, then the impact force of the rotary-impact mechanism 32 switches from "High" to "Low." When the impact force is set to "High," both the left and right light-emitting parts 108*a*, 108*b* turn ON (illuminate). If the impact force is switched to "Low," then the right-side light-emitting part 108*b* turns OFF and the left-side light-emitting part 108*a* alone turns ON (illuminates). The two light-emitting parts 108*a*, 108*b* both light up in red. The word "Low" is printed adjacent to the front side of the left-side light-emitting part 108*a*, and the word "High" is printed adjacent to the front side of the right-side light-emitting part 108*b*. The right-side light-emitting part 108*b*, which has the word "High" printed adjacent thereto, extends farther on the front side than does the left-side light-emitting part 108*a*, which has the word "Low" printed adjacent thereto. The front parts of both of the light-emitting parts 108*a*, 108*b* are formed into pointed shapes that are tilted in the same direction.

If the impact-force-changing switch 105 is pressed once more while the left-side light-emitting part 108*a* alone is turned ON (illuminated) and the impact force is set to "Low," then the left-side light-emitting part 108*a* also turns OFF and a light-emitting part 109 of the mode-display 106 turns ON (illuminates). If the light-emitting part 109 turns ON (illuminates), then the operation mode is indicated as having been switched from the impact mode to the A-mode. In the A-mode, the operating state of the tool-main-body part 10 is a specific operation mode that is set in advance, e.g., in the manner that was described in the preceding embodiments. That is, if the operating state of the tool-main-body part 10 is switched to the A-mode as mentioned above, then, as shown in FIG. 17, the electric motor 20 rotates at low speed in the screw-tightening initial stage and switches to high-speed rotation when the screw-tightening load exceeds a prescribed (preset) value (e.g., if a fixed count (predetermined number) of impacts is counted). Thus, in the A-mode, control is performed such that the electric motor automatically switches to high-speed rotation in accordance with the increasing screw-tightening load.

The mode-display 106 has a configuration in which the letter "A" and the one light-emitting part 109 are disposed within a border106*a* that is approximately rectangular. The light-emitting part 109 of the mode-display 106 lights up in a color (e.g., green) that differs from those of the light-emitting parts 108*a*, 108*b*, which communicate the strength/weakness of the impact force. LEDs that emit red light are used as the light sources in the light-emitting parts 108*a*, 108*b*, and an LED that emits green light is used as the light source in the light-emitting part 109. As described above, every time the impact-force-changing switch 105 is pressed, the operation mode switches, in this order: "High" "Low" "A."

The word "IMPACT" associated with the impact-force-changing switch 105 is surrounded by a circular border 105*a*. A guide line 105*b* is drawn from the lower part of the border 105*a*. The guide line 105*b* extends to the lower side of the impact-force-display 108. The words "LIGHT (press-and-hold)" are printed at the end of the guide line 105*b*. If the impact-force-changing switch 105 is pressed and held for, for example, approximately 2 seconds, then the illumination device 5 turns ON, thereby making it convenient to perform screw-tightening work in dark locations, etc. In this turned-ON state, if the impact-force-changing switch 105 is pressed and held once more, then the illumination device 5 turns OFF. The impact-force-changing switch 105, in addition to serving as an impact-force-changing switch, also serves as a light switch for the illumination device 5.

According to the display 100 of the seventh embodiment, the impact-force-changing switch 105, which switches the impact force of the rotary-impact mechanism 32, the impact-force-display 108, which indicates (shows) the impact force, and the mode-display 106, which indicates that the operating state of the rotary-impact mechanism 32 is in a preset operation mode (A-mode), are disposed in one left-right transverse row (a transversely lined-up state). Thereby, the display 100 is configured compactly in the front-rear direction, and therefore the display 100 can be disposed on the power-supply unit 102, which has a layout space in the front-rear direction that is narrower than in the first through sixth embodiments.

In addition, by making the illuminating color (red) of the light-emitting parts 108*a*, 108*b* of the impact-force-display 108 and the illuminating color (green) of the light-emitting part 109 of the mode-display 106 different, it becomes possible to increase the visual distinctiveness of the display 100 and to communicate yet more information on the compact display 100. In the light-emitting parts 108*a*, 108*b*, 109 exemplified above, configurations are exemplified in which single color LEDs serve as the light sources, but an even more compact design can be achieved by using one LED and varying the illuminating color for each communication content (i.e. each type of information that is being communicated to the user). To vary the illuminating color of the light-emitting parts, a configuration may be adopted in which the illuminating color of the light sources is varied, or in which the illuminating color is varied by affixing films (light filters) of differing colors to light sources of the same color.

A rotary-impact tool (an impact driver) was illustrated as the representative, non-limiting power tool 1 comprising the displays of the various embodiments illustrated above, but the illustrated displays 19 (50, 60, 70, 100) can be applied to other power tools, such as drilling tools, cutting tools, etc.

In addition, a rechargeable power tool, in which the battery pack 40 serves as the power supply, was exemplified, but the present teaching can similarly be applied also to an AC-power-supply-type power tool, in which, for example, a 100-240 V commercial power supply serves as the power supply.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

It is noted that text identifiers associated with light-emitting parts (e.g., T, High, Medium, Low, Custom, Assist, etc.) has been indicated as being printed or indicated adjacent to the light-emitting part in the preferred embodiments and drawings. However, one or more such text identifiers optionally may be printed directly on the corresponding light-emitting part.

EXPLANATION OF THE REFERENCE NUMBERS

1 Power tool (impact driver)
2 Screw (for coupling the half cases)
3 Hand strap
5 Illumination device (LED)
5*a* Transparent cover
6 Changing switch (direction reversing switch)
7 Control board (circuit board)
7*a* Capacitor
8 Case
9 Controller
S1, S2, S3 Switch parts
d1, d2, d3 Button switches
e1-e9 LEDs (light-emitting diodes)
L1-L9 Light-emitting parts
10 Tool-main-body part (housing)
11 Main-body case
12 Rear-part case
12*a* Bearing-retaining part
15 Grip part (handle)
16 Trigger (switch)
17 Power-supply unit
18 Main switch
19 Display (first embodiment)
19*a* Light-conducting part
20 Electric motor
21 Stator
22 Rotor
23 Sensor board
23*a* Set screw
23*b* Inner-circumference hole
24 Motor shaft
25 Bearing (front side)
26 Bearing (rear side)
27 Intermediate-partition wall
28 Cooling fan
30 Planetary-gear mechanism
31 Drive shaft
31 Rotary-impact mechanism
32*a* Hammer
32*b* Compression spring
32*c* Steel ball
33 Anvil
34 Bearing
35 Tool-retaining part
36 Output shaft
40 Battery pack
50 Display (second embodiment)

50a Light-conducting part
50b, 50c Borders
60 Display (third embodiment)
60a Border
70 Display (fourth embodiment)
70a Border
80 Display (fifth embodiment)
90 Display (sixth embodiment)
100 Display (seventh embodiment)
101 Grip part (handle)
102 Power-supply unit
103 Battery pack (10.8 V)
105 Impact-force-changing switch
105a Border
105b Guide line
106 Mode-display
106a Border
108 Impact-force-display
108a Light-emitting part
108b Light-emitting part
109 Light-emitting part

The invention claimed is:

1. A power tool comprising:
a motor;
a tool accessory-retaining part configured to be driven by the motor;
a controller configured to control the motor according to at least first and second motor rotational speeds that are manually selectable and at least first and second driving modes that are manually selectable, the at least first and second driving modes differing in a sequence of motor rotational speeds during a fastening operation; and
a display comprising at least first and second LEDs connected to the controller, a motor speed change switch connected to the controller, a driving mode change switch connected to the controller, a driving mode light connected to the controller and a motor speed light connected to the controller,
wherein the controller is configured to:
select the rotational speed of the motor from among the at least first and second motor rotational speeds in accordance with manual operation of the motor speed change switch and to visually indicate the selected rotational speed of the motor by illuminating at least one of the at least first and second LEDs;
select the driving mode of the motor from among the at least first and second driving modes in accordance with manual operation of the driving mode change switch and to visually indicate the selected driving mode of the motor by illuminating at least one of the at least first and second LEDs;
illuminate the driving mode light and turn OFF the motor speed light when the driving mode change switch has been operated and at least one of the at least first and second LEDs is being illuminated to visually indicate the selected driving mode; and
illuminate the motor speed light and turn OFF the driving mode light when the motor speed change switch has been operated and at least one of the at least first and second LEDs is being illuminated to visually indicate the selected rotational speed.

2. The power tool according to claim 1, wherein:
the driving mode light is located closer to the driving mode change switch than to the rotational speed change switch, and
the rotational speed light is located closer to the rotational speed change switch than to the driving mode change switch.

3. The power tool according to claim 1, wherein:
a first set of inscriptions indicating the at least first and second rotational speeds is provided on a first side of the at least first and second LEDs; and
a second set of inscriptions indicating the at least first and second driving modes is provided on a second side of the at least first and second LEDs.

4. The power tool according to claim 1, wherein the motor speed change switch and the driving mode change switch are each push button switches.

5. The power tool according to claim 4, wherein the display includes:
a first border line around the motor speed change switch, and
a second border line around the driving mode change switch.

6. The power tool according to claim 5, wherein at least one of the driving modes is a self-drilling screw driving mode.

7. The power tool according to claim 6, wherein at least one of the driving modes is a fastener assist driving mode.

8. The power tool according to claim 1, wherein:
the display includes a third LED connected to the controller; and
the controller is further configured to drive the motor at a high rotational speed corresponding to the first motor rotational speed, a medium rotational speed corresponding to the second motor rotational speed or a low rotational speed corresponding to a third motor rotational speed in accordance with manual operation of the motor speed change switch and to illuminate the selected rotational speed on at least one of the first, second and third LEDs.

9. The power tool according to claim 8, further comprising:
a hammer configured to be driven by the motor; and
an anvil configured to receive rotary impacts from the hammer and to transmit the rotary impacts to the tool accessory-retaining part.

10. The power tool according to claim 1, further comprising:
a hammer configured to be driven by the motor; and
an anvil configured to receive rotary impacts from the hammer and to transmit the rotary impacts to the tool accessory-retaining part.

11. The power tool according to claim 10, wherein:
one of the at least first and second driving modes is a self-drilling screw driving mode, and
the controller is configured to automatically drive the motor according to a first redetermined sequence of motor rotational speeds in response to selection of the self-drilling screw driving mode by manual operation of the driving mode change switch such that the motor is rotated at a first rotational speed and then, after the hammer has started to impact the anvil, the rotational speed of the motor is decreased to a second rotational speed that is slower than the first rotational speed.

12. The power tool according to claim 11, wherein:
one of the at least first and second driving modes is a fastener assist driving mode, and
the controller is configured to automatically drive the motor according to a second predetermined sequence of motor rotational speeds in response to selection of the fastener assist driving mode by manual operation of the driving mode change switch such that the motor is rotated at a first rotational speed and then, after the hammer has started to impact the anvil, the rotational speed of the motor is increased to a second rotational speed that is higher than the first rotational speed.

13. The power tool according to claim 1, wherein the display includes:
a first border line around the motor speed change switch, and
a second border line around the driving mode change switch.

14. The power tool according to claim 1, wherein:
the first and second motor rotational speeds are manually selectable by depressing the motor speed change switch and are respectively first and second maximum rotational speeds that differ from each other such that the brushless motor is drivable by pulling a trigger switch: (i) between zero and the first maximum rotational speed when the first maximum rotational speed has been manually selected and (i) between zero and the second maximum rotational speed when the second maximum rotational speed has been manually selected, and
the first and second driving modes are manually selectable by depressing the driving mode change switch and are respectively first and second predetermined sequences of two or more different motor rotational speeds that are stored in the controller and vary during a single fastening operation, the two or more different motor rotational speeds of the first predetermined sequence differing from the two or more different motor rotational speeds of the second predetermined sequence.

15. The power tool according to claim 1, further comprising:
a tool-main-body part that houses the brushless motor;
a grip part connected to the tool-main-body part;
a power-supply unit disposed at a terminal end of the grip part opposite of the tool-main-body part;
a trigger provided on a front-surface upper part of the grip part and operably coupled to a main switch disposed in the grip part;
an illumination device comprising one or more LEDs located on a front portion of the tool-main-body part and configured to illuminate a work area; and
an operation panel disposed on the power-supply unit and containing the at least first and second LEDs, the motor speed change switch, the driving mode change switch, the driving mode light and the motor speed light;
wherein:
the main switch and the illumination device are electrically connected to the controller, and
in response to the trigger being pulled, the controller is configured to turn ON the illumination device and drive the brushless motor in accordance with either (i) one of the at least first and second motor rotational speeds selected by manual operation of the motor speed change switch or (ii) one of the at least first and second driving modes selected by manual operation of the driving mode switch.

16. An impact tool comprising:
a brushless motor;
a hammer configured to be driven by the brushless motor;
an anvil configured to receive rotary impacts from the hammer;
a hammer case housing the hammer;
a main housing that accommodates the motor;
a controller;
a rotational speed change switch connected to the controller and configured to manually select a rotational speed of the motor from a plurality of selectable motor rotational speeds;
a driving mode change switch connected to the controller and configured to manually select a driving mode of the motor from a plurality of selectable driving modes that differ from each other in a sequence of motor rotational speeds during a fastening operation;
a handle extending from the main housing;
a power-supply unit disposed at a terminal end of the housing;
a battery pack detachably attached to the power-supply unit; and
a display disposed on the power-supply unit;
wherein:
the display includes a plurality of LEDs configured to selectively visually indicate both the plurality of selectable motor rotational speeds and the plurality of selectable driving modes; and
the plurality of LEDs is disposed between the rotational speed change switch and the driving mode change switch.

17. The impact tool according to claim 16, wherein the display further comprises:
a first set of inscriptions indicating the selectable rotational speeds; and
a second set of inscriptions indicating the selectable driving modes;
wherein the plurality of LEDs is disposed between the first set of inscriptions and the second set of inscriptions.

18. The impact tool according to claim 16, wherein the display further comprises at least one additional light dedicated to only indicating whether the plurality of LEDs is currently visually indicating the selected motor rotational speed or the selected driving mode, the at least one additional light not visually indicating the selected motor rotational speed or the selected driving mode.

19. The impact tool according to claim 16, wherein the display further includes:
the rotational speed change switch;
the driving mode change switch;
a rotational speed light; and
a driving mode light;
wherein:
the plurality of selectable motor rotational speeds is a plurality of predetermined maximum motor rotational speeds, up to which the brushless motor is rotationally drivable in response to a trigger being pulled;
the plurality of selectable motor driving modes is a plurality of predetermined driving modes that respectively define different predetermined sequences of different motor rotational speeds for automatically driving the brushless motor in response to the trigger being pulled; and
wherein the controller is configured to:
illuminate the rotational speed light and one or more of the plurality of LEDs when the rotational speed switch is pressed, and
illuminate the driving mode light and one or more of the plurality of LEDs when the driving mode switch is pressed.

20. A power tool comprising:
a main body housing that accommodates a motor;
a handle extending from the main body housing;

a power-supply unit disposed at a terminal end of the handle and configured to detachably attach a battery pack;

a controller disposed within the power-supply unit and including a motor control circuit board configured to control the motor;

a display provided on the power supply part and configured to visually indicate a selected operating state of the motor controlled by the controller;

wherein the display includes:
- a first switch;
- a second switch;
- a first light disposed adjacent to the first switch and configured to be turned ON/OFF by manual operation of the first switch;
- a second light disposed adjacent to the second switch and configured to be turned ON/OFF by manual operation the second switch; and
- a plurality of third lights disposed side by side and between the first switch and the second switch;

wherein the controller is configured to illuminate the first light when the first switch is manually operated while illuminating at least one of the plurality of third lights in accordance with a first operation mode selected from a first set of operation modes of the power tool that was manually selected via the first switch; and wherein the controller is configured to illuminate the second light when the second switch is manually operated while illuminating at least one of the plurality of third lights in accordance with a second operation mode selected from a second set of operation modes of the power tool that was manually selected via the second switch, the first set of operation modes differing from the second set of operation modes.

21. The power tool according to claim 20, wherein:

a first set of inscriptions associated with first set of operation modes is provided on a first side of the plurality of third lights, and a second set of inscriptions associated with second set of operation modes is provided on a second side of the plurality of third lights that is opposite of the first side of the plurality of third lights.

* * * * *